March 14, 1950 J. WICKS 2,500,392

REPEATER SWITCHING TELEPHONE SYSTEM

Filed March 25, 1948 6 Sheets-Sheet 1

INVENTOR.
John Wicks
BY
Smith, Olsen & Baird
Attys.

March 14, 1950 J. WICKS 2,500,392

REPEATER SWITCHING TELEPHONE SYSTEM

Filed March 25, 1948 6 Sheets-Sheet 2

*INVENTOR.*
John Wicks

BY
Smith, Olsen & Baird
Attys.

March 14, 1950 J. WICKS 2,500,392

REPEATER SWITCHING TELEPHONE SYSTEM

Filed March 25, 1948 6 Sheets-Sheet 3

INVENTOR.
John Wicks
BY
Smith, Olsen & Baird
Attys.

March 14, 1950 J. WICKS 2,500,392

REPEATER SWITCHING TELEPHONE SYSTEM

Filed March 25, 1948 6 Sheets-Sheet 4

*INVENTOR.*
John Wicks
*BY*
Smith, Olsen & Baird
Attys.

REPEATER SWITCHING TELEPHONE SYSTEM

Filed March 25, 1948 6 Sheets-Sheet 5

INVENTOR.
John Wicks
BY
Smith, Olsen + Baird
Attys.

March 14, 1950 J. WICKS 2,500,392

REPEATER SWITCHING TELEPHONE SYSTEM

Filed March 25, 1948 6 Sheets-Sheet 6

*INVENTOR.*
John Wicks.

*BY*
Smith, Olsen & Baird
Attys

Patented Mar. 14, 1950

2,500,392

UNITED STATES PATENT OFFICE 2,500,392

REPEATER SWITCHING TELEPHONE SYSTEM

John Wicks, Biloxi, Miss., assignor to Automatic Electric Laboratories, Inc., Chicago, Ill., a corporation of Delaware Application March 25, 1948, Serial No. 16,905

12 Claims. (Cl. 179—27)

The present invention relates to automatic telephone systems, and more particularly to such systems incorporating repeater switching arrangements.

It is a general object of the present invention to provide in an automatic telephone system an improved repeater switching arrangement in which digits are transmitted from a calling switchboard to the automatic switches via a special control conductor independent of both the hold conductor and the pair of line or talking conductors in order to minimize the return of switching noises over the line conductors to the associated switchboard.

Another object of the invention is to provide in a repeater switching arrangement of the character noted, an improved relay network selectively controlled to receive switch setting digits from the switchboard and to return supervisory signals and controls back to the switchboard.

A further object of the invention is to provide in a repeater switching arrangement of the character noted, an improved relay network that includes a source of current supply independent of the exchange batteries in two interconnected exchanges so that satisfactory operation of the repeaters in the two exchanges is obtained notwithstanding an under voltage condition of the exchange battery in one of the exchanges.

Further features of the invention pertain to the particular arrangement of the circuit elements of the system, whereby the above-outlined and additional operating features thereof are attained.

Figure 1:
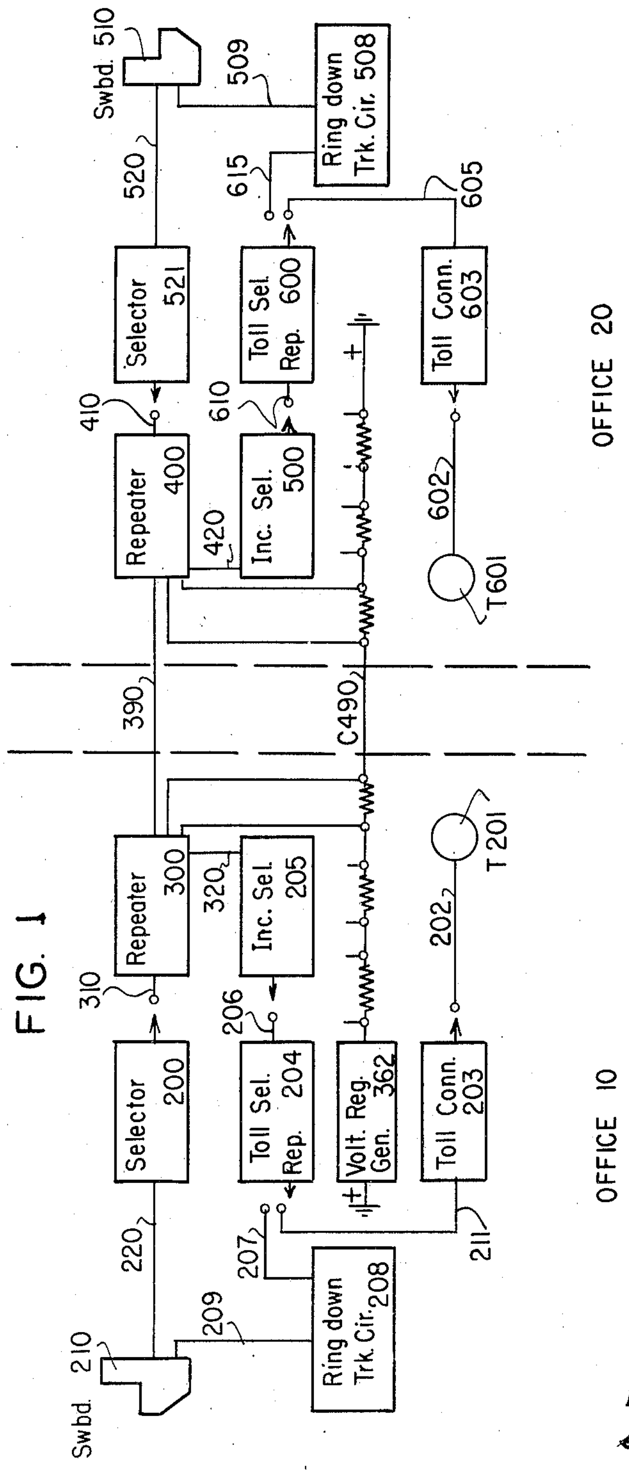
Figure 7:
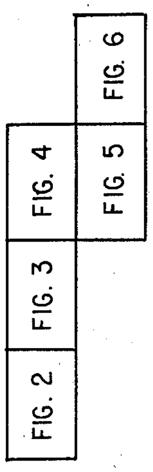

The invention, both as to its organization and method of operation, together with further objects and advantages thereof will best be understood by reference to the following specification taken in connection with the accompanying drawings, in which Figure 1 is a schematic diagram of a telephone system embodying the present invention and illustrating the general arrangement of the apparatus incorporated therein; Figs. 2 to 6, inclusive, taken together, illustrate the details of certain of the apparatus incorporated in the telephone system, which apparatus has embodied therein the features of the invention as briefly outlined above; and Fig. 7 is a block diagram illustrating the mode of combining Figs. 2 to 6, inclusive, to form a unified circuit diagram.

Figure 2:
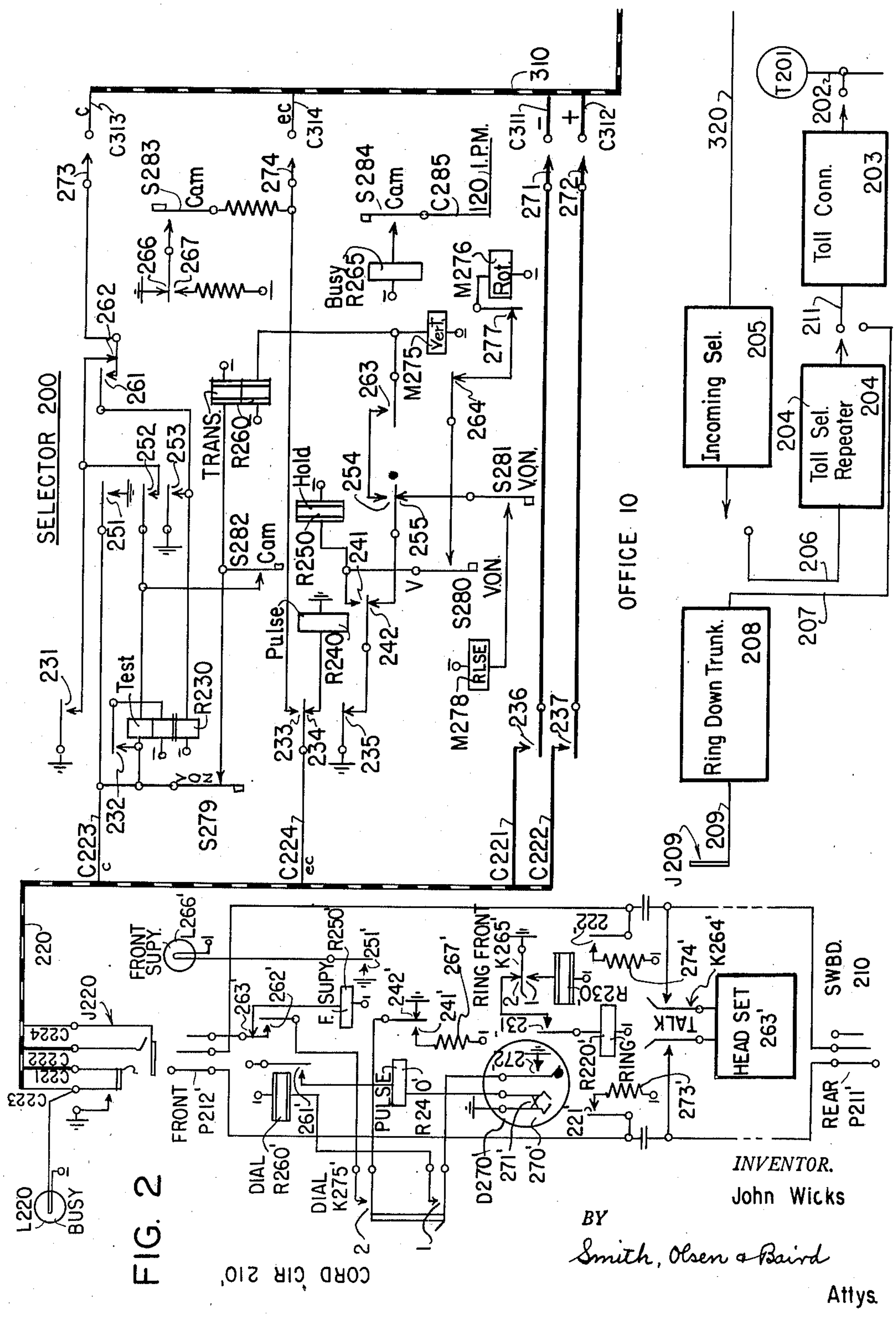
Figure 3:
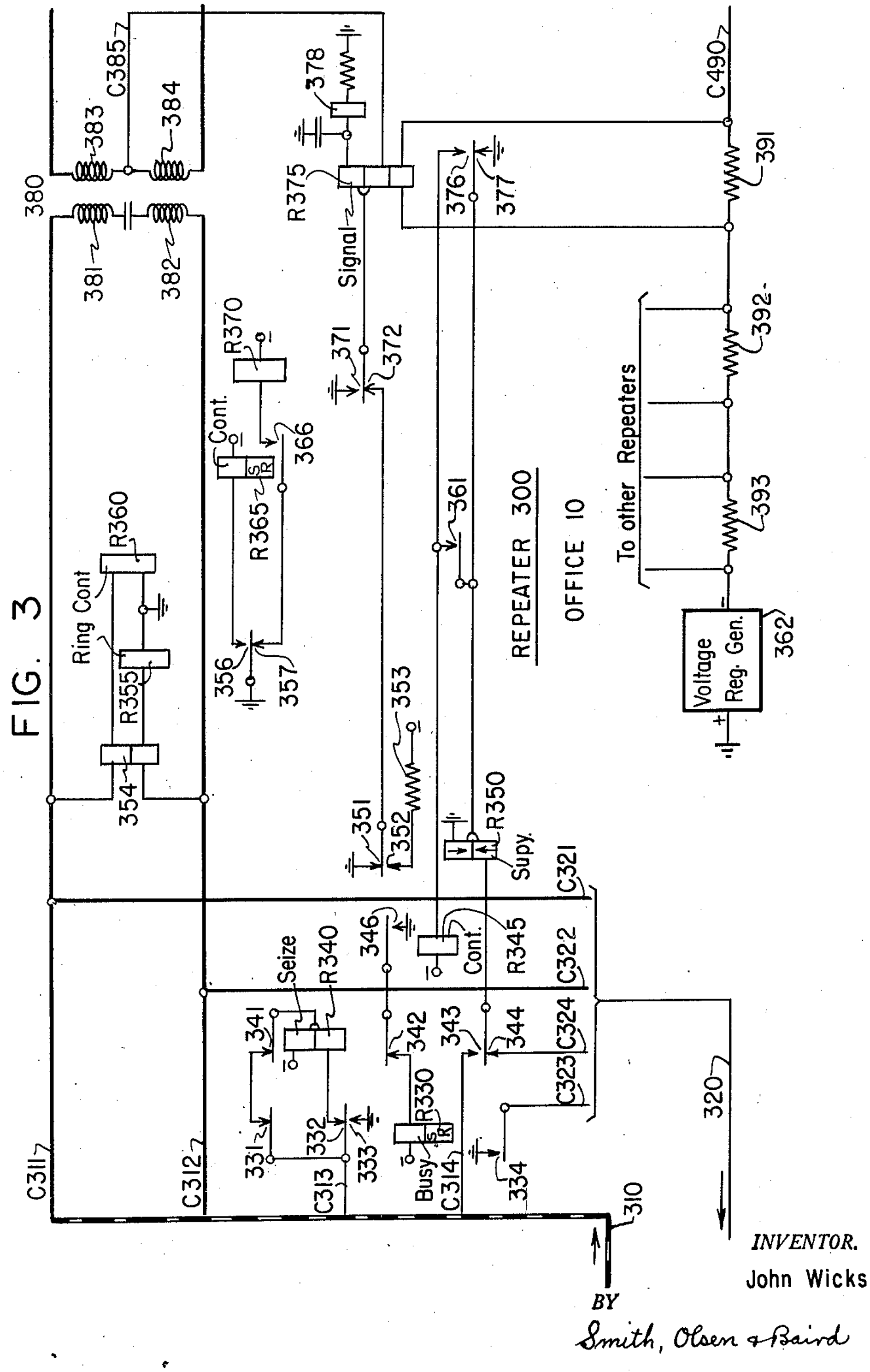
Figure 4:
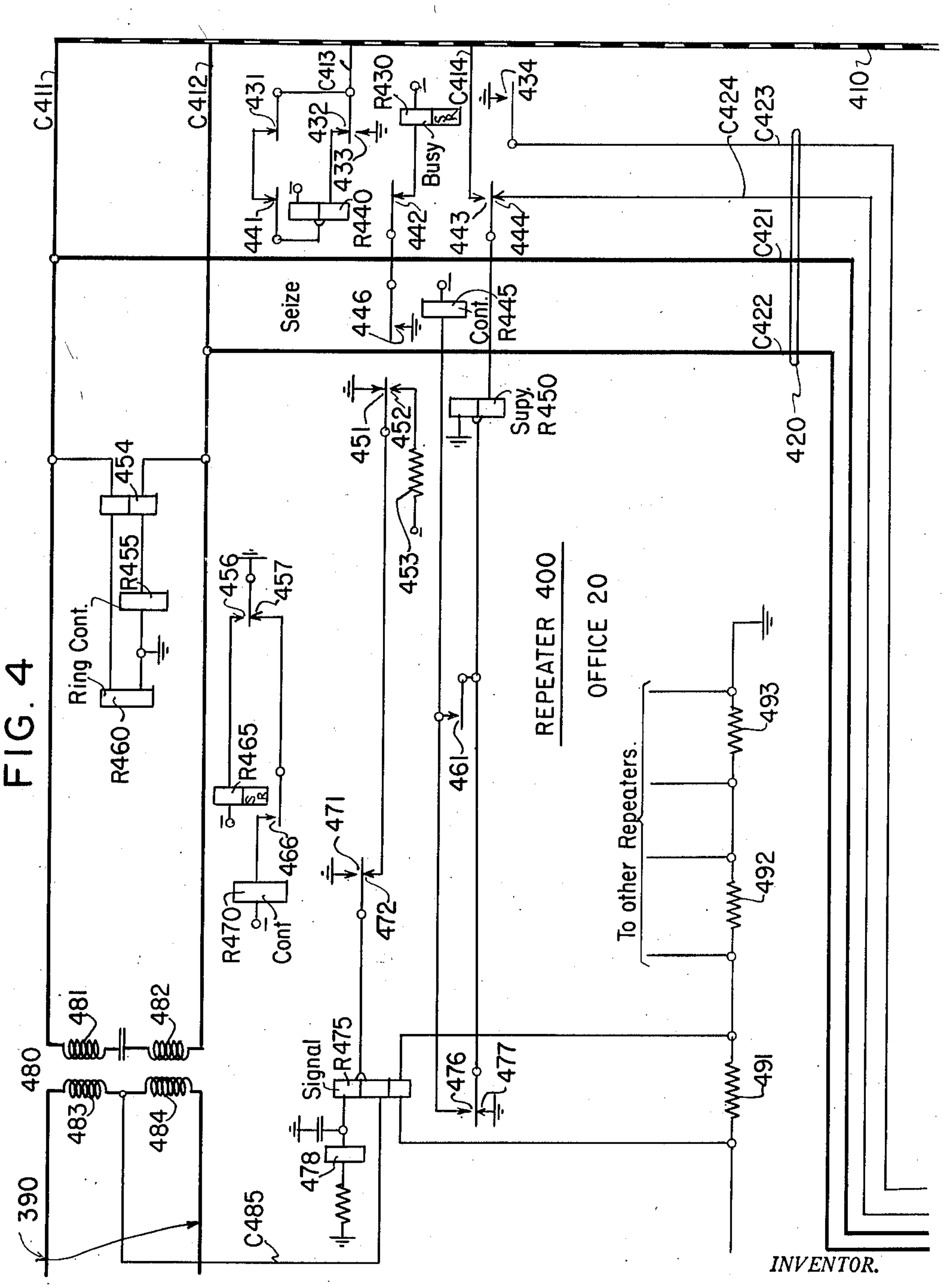
Figure 5:
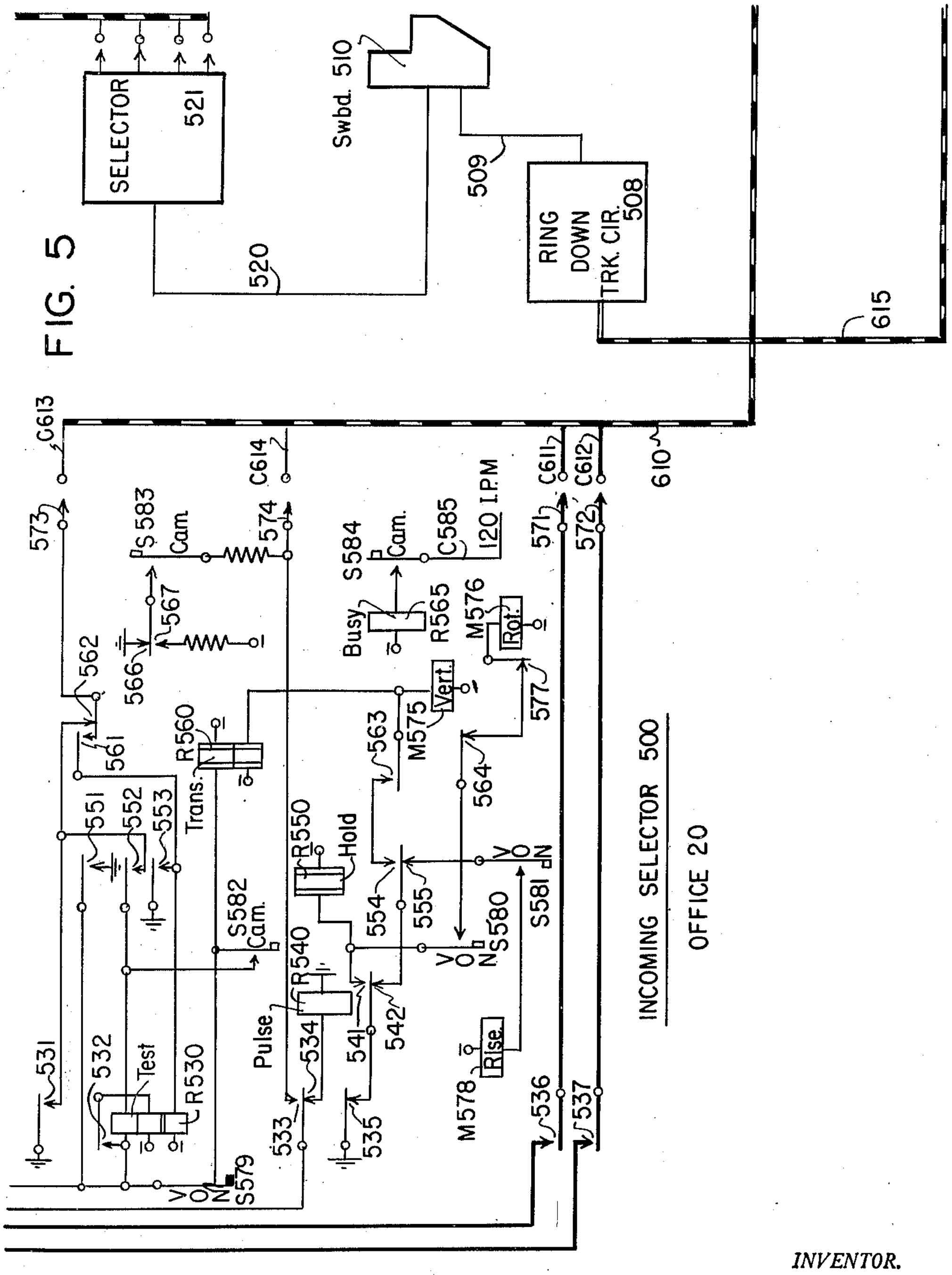
Figure 6:
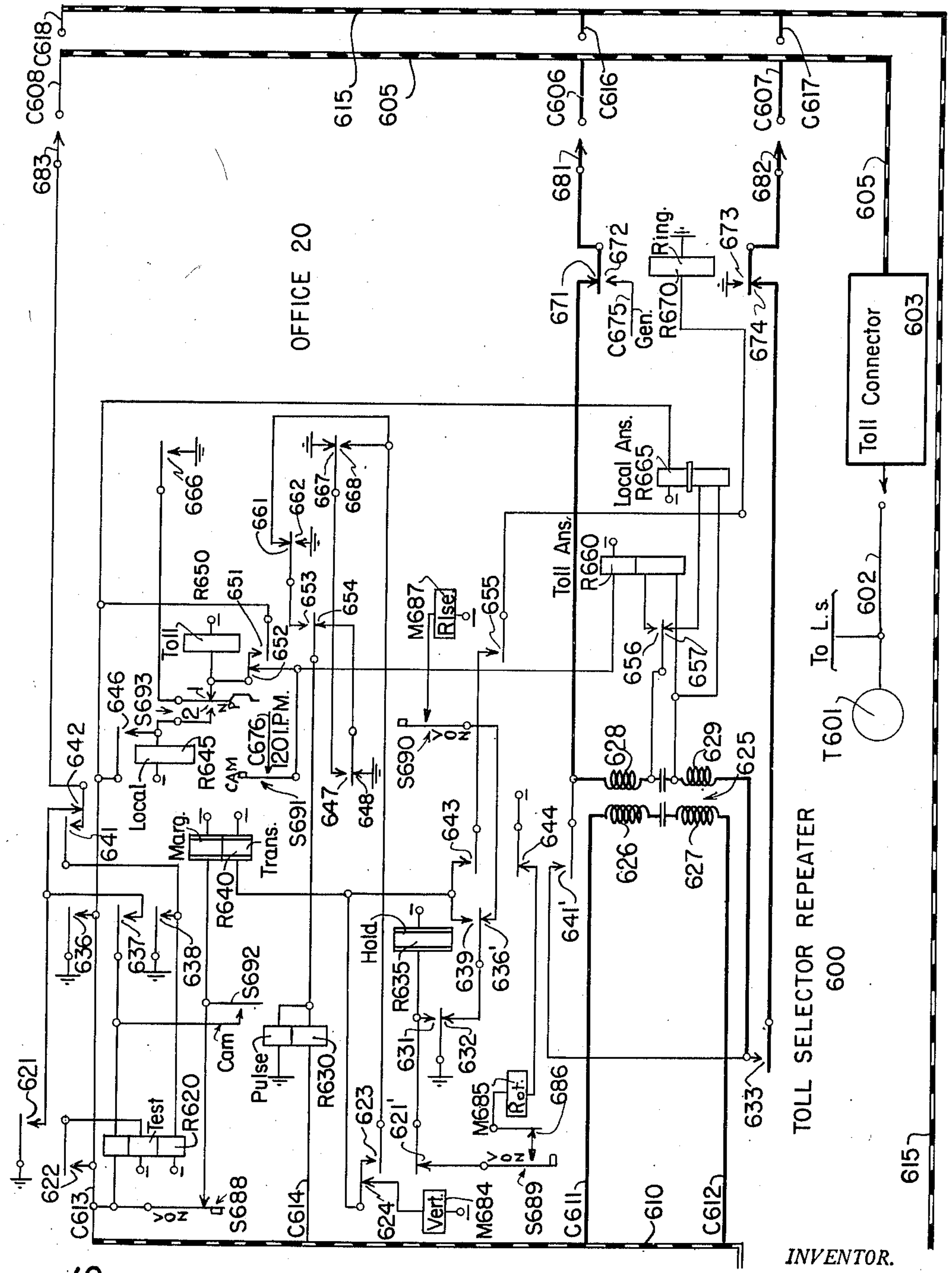

More particularly, Fig. 2 illustrates the details of one of the cord circuits disposed at the switchboard in one of the offices, as well as the details of one of the selectors accessible thereto; Fig. 3 illustrates the details of one of the repeaters disposed in the one office mentioned; Fig. 4 illustrates the details of one of the repeaters disposed in another of the offices; Fig. 5 illustrates the details of one of the incoming selectors disposed in the other office; and Fig. 6 illustrates the details of one of the toll selector repeaters disposed in the other office.

Referring now more particularly to Fig. 1 of the drawings there is illustrated an automatic telephone system comprising two offices 10 and 20. The office 10 is of the automatic type serving a number of subscriber substations, including the subscriber substation T201, and comprising a switchboard 210 of the manual dial type. Likewise, the office 20 is of the automatic type serving a number of subscriber substations, including the subscriber substation T601, and comprising a switchboard 510 of the manual dial type. The offices 10 and 20 are interconnected by a group of trunks, including the trunk 390, as well as by a potentiometer conductor C490 that is utilized for a purpose more fully explained hereafter. The opposite end of the trunks 390, etc., terminate in repeaters respectively disposed in the office 10 and 20, the trunk 390 terminating in the repeaters 300 and 400 respectively disposed in the offices 10 and 20. One end of the potentiometer conductor C490 is connected via a plurality of resistors 491, etc., to ground potential in the office 20; while the other end of the potentiometer conductor C490 is connected via a plurality of resistors 391, etc., to the negative terminal of a voltage regulated generator 362 disposed in the office 10; the positive terminal of the generator 362 being connected to ground potential in the office 10. Finally, ground potentials in the offices 10 and 20 are connected together via earth or a suitable conductor, not shown, so that there is substantially no voltage difference therebetween.

The office 10 also comprises a group of selectors, including the selector 200, accessible to the switchboard 210 and having access to the group of repeaters, including the repeater 300. Each of the repeaters 300, etc., is provided with an incoming selector 205, etc. individual thereto and having access to a group of toll selector repeaters, including the toll selector repeater 204. Also the office 10 comprises a plurality of groups of toll connectors, one of the groups including the toll connector 203 having access to the group of subscriber substations, including the subscriber substation T201. Further the office 10 comprises a group of ring-down trunk circuits, including the ring-down trunk circuit 208, accessible to the switchboard 210. Further the toll selector repeaters 204, etc., have access to the groups of toll connectors and to the group of ring-down trunk circuits. Finally, each subscriber substation T201, etc., has a subscriber line 202, etc., extending thereto that is provided with a line switch, not shown, individually associated therewith for the purpose of providing access to an outgoing switch train, not shown.

Similarly, the office 20 also comprises a group of selectors, including the selector 521, accessible to the switchboard 510 and having access to the group of repeaters, including the repeater 400. Each of the repeaters 400, etc., is provided with an incoming selector 500, etc., individual thereto and having access to a group of toll selector repeaters, including the toll selector repeater 600. Also the office 20 comprises a plurality of groups of toll connectors, one of the groups including the toll connector 603 having access to the group of subscriber substations, including the subscriber substation T601. Further the office 20 comprises a group of ring-down trunk circuits, including the ring-down trunk circuit 508, accessible to the switchboard 510. Further the toll selector repeaters 600, etc., have access to the groups of toll connectors and to the group of ring-down trunk circuits. Finally, each subscriber substation T601, etc., has a subscriber line 602, etc., extending thereto that is provided with a line switch, not shown, individually associated therewith for the purpose of providing access to an outgoing switch train, not shown.

Preferably, the switchboards 210 and 510 are identical; the switchboard 210 comprising, as shown in Fig. 2, a plurality of cord circuits 210', etc. The cord circuit 210' comprises a rear plug P211' and a front plug P212', a manual dial D270', a talk key K264', a dial front key K275' and a ring front key K265'. Also the cord circuit 210' comprises a rear supervisory lamp, not shown, associated with the rear plug P211' and a front supervisory lamp L266' associated with a front plug P212', and a relay group including two ring relays R220' and R230', a pulse relay R240', a front supervisory relay R250' and a dial relay R260'. Finally, the switchboard 210 comprises a headset 263' that may be connected by the talk key K264' to the cord circuit 210'.

Preferably, the selectors 200, 251, etc., are identical; the selector 200 comprising, as shown in Fig. 2, an incoming trunk 220 terminating in a jack J220 disposed at the switchboard 210 and provided with an associated busy lamp L220. Also the selector 200 comprises a relay group including a test relay R230, a pulse relay R240, a hold relay R250, a transfer relay R260 and a busy relay R265. Further the selector 200 comprises a Strowger mechanism including four wipers 271, 272, 273 and 274, a vertical magnet M275 for driving the wiper carriage step by step in the vertical direction away from its normal vertical position, a rotary magnet M276 for driving the wiper carriage step by step in the rotary direction away from its normal rotary position, and a release magnet M278 for releasing the wiper carriage and for causing it to be returned to its normal rotary and vertical positions. Also associated with the Strowger mechanism are three sets of switch springs S279, S280 and S281 that are operated when the wiper carriage is driven one step in the vertical direction away from its normal vertical position, and three sets of switch springs S282, S283 and S284 that are operated when the wiper carriage is driven eleven steps in the rotary direction away from its normal rotary position.

Preferably the repeaters 300, 400, etc., are identical; the repeater 300 comprising, as shown in Fig. 3, an incoming trunk 310 and a repeating coil 380 operatively connected to the trunk 390. Also the repeater 300 comprises a relay group including a busy relay R330, a seize relay R340, a control relay R345, a supervisory relay R350, two ring control relays R355 and R360, two control relays R365 and R370 and a signal relay R375. Likewise, the repeater 400 comprises, as shown in Fig. 4, an incoming trunk 410 and a repeating coil 480 operatively connected to the trunk 390. Also the repeater 400 comprises a relay group including a busy relay R430, a seize relay R440, a control relay R445, a supervisory relay R450, two ring control relays R455 and R460, two control relays R465 and R470 and a signal relay R475. In the repeaters 300 and 400, the lower windings of the signal relays R375 and R475 are respectively bridged across the resistors 391 and 491 included in the potentiometer connection comprising the potentiometer conductor C490. It will be understood that in a similar manner the lower windings of the signal relays in the other pairs of repeaters, not shown, are bridged across the pairs of resistors 392, 492 and 393, 493, etc. Finally, it is noted that the voltage regulator 362 disposed in the office 10 may be of any suitable type producing a closely regulated potential of approximately 48 volts. Also in this regard it will be understood that in the offices 10 and 20, the battery voltage is approximately 48 volts, the positive terminal of battery voltage being indicated as connected to ground potential.

Preferably, the incoming selectors 205, 500, etc., are identical; the incoming selector 500 comprising, as shown in Fig. 5, an incoming trunk 420 and a relay group including a test relay R530, a pulse relay R540, a hold relay R550, a transfer relay R560 and a busy relay R565. Also the incoming selector 500 comprises a Strowger mechanism including four wipers 571, 572, 573 and 574, a vertical magnet M575 for driving the wiper carriage step by step in the vertical direction away from its normal vertical position, a rotary magnet M576 for driving the wiper carriage step by step in the rotary direction away from its normal rotary position, and a release magnet M578 for releasing the wiper carriage and for causing it to be returned to its normal rotary and vertical positions. Also associated with the Strowger mechanism are three sets of switch springs S579, S580 and S581 that are operated when the wiper carriage is driven one step in the vertical direction away from its normal vertical position, and three sets of switch springs S582, S583 and S584 that are operated when the wiper carriage is driven eleven steps in the rotary direction away from its normal rotary position.

Preferably, the toll selector repeaters 204, 600, etc., are identical; the toll selector repeater 600 comprising, as shown in Fig. 6, an incoming trunk 610 and a repeating coil 625. Also the toll selector repeater 600 comprises a relay group including a test relay R620, a pulse relay R630, a hold relay R635, a transfer relay R640, a local relay R645, a toll relay R650, a toll answer relay R660, a local answer relay R665, and a ring relay R670. Also the toll selector repeater 600 comprises a Strowger mechanism including three wipers 681, 682 and 683, a vertical magnet M684 for driving the wiper carriage step by step in the vertical direction away from its normal vertical position, a rotary magnet M685 for driving the wiper carriage step by step in the rotary direction away from its normal rotary position, and a release magnet M687 for releasing the wiper carriage and for causing it to be returned to its normal rotary and vertical positions. Associated with the Strowger mechanism are three sets of switch springs S688, S689 and S690 that are operated when the wiper carriage is driven one step in the vertical direction away from its normal vertical position, two sets of switch springs S691 and S692 that are operated when the wiper carriage is driven eleven steps in the rotary direction away from its normal rotary position, and a set of switch springs S693 that is operated when the wiper carriage is driven in the vertical direction to a level in the associated contact bank wherein a group of trunks extending to a group of toll connectors is terminated.

Finally, in the offices 10 and 20 the toll connectors 203, 603, etc., are of the conventional Strowger type; the ring-down trunk circuits 208, 508, etc., are of any suitable type; the line switches, not shown, associated with the subscriber lines 202, 602, etc., may be of any suitable type; and the subscriber substations T201, T601, etc., are provided with conventional subscriber substation apparatus.

A better understanding of the connection and arrangement of the apparatus incorporated in the telephone system will be facilitated from a consideration of the extension of the various calls involving the offices 10 and 20.

First considering the extension of a call from the calling switchboard 210 in the office 10 to a called subscriber substation, such for example, as the subscriber substation T601 in the office 20, the operator at the calling switchboard 210 first selects an idle cord circuit, such for example, as the cord circuit 210' and inserts the front plug P212' thereof into the jack terminating a trunk extending to an idle one of the selectors in the group, including the selector 200. At this time assuming that the selector is idle, battery potential via the upper winding of the transfer relay R260 and the set of switch springs S279 is applied to the control conductor C223 of the incoming trunk 220, thereby to short-circuit the busy lamp L220 indicating to the operator at the calling switchboard 210 the circumstance noted. Now assuming that the front plug P212' is inserted into the jack J220 terminating the incoming trunk 220, the contacts of the jack J220 are closed completing a circuit for illuminating the busy lamp L220 in order to indicate the busy condition of the selector 200 at this time. Also when the front plug P212' is inserted into the jack J220 a series circuit is completed for energizing the winding of the front supervisory relay R250' in the cord circuit 210' and the winding of the pulse relay R240 in the selector 200; this circuit extending from ground potential by way of the winding of the pulse relay R240, the contacts 234, the EC conductor C224 of the incoming trunk 220, the sleeve of the jack J220, the sleeve of the front plug 212', the contacts 263' and the winding of the front supervisory relay R250' to battery potential. When this series circuit is thus completed, the front supervisory relay R250' and the pulse relay R240 operate. Also the application of ground potential, at the contacts of the jack J220, upon the control conductor C223 of the incoming trunk 220 complete a circuit substantially identical to that previously traced for energizing the upper winding of the transfer relay R260 in order to cause the latter relay to operate.

Upon operating the front supervisory relay R250' completes, at the contacts 251', a circuit for illuminating the front supervisory lamp L266', thereby to indicate the circumstance that the call extended via the front plug P212' has not yet been answered. Upon operating the pulse relay R240 completes, at the contacts 241, a circuit, including the contacts 235, for operating the hold relay R250. Upon operating the hold relay R250 completes, at the contacts 251, a multiple path for applying ground potential to the control conductor C223 of the incoming trunk 220; and completes, at the contacts 253, a circuit for energizing the lower winding of the test relay R230 in order to render the latter relay exceedingly fast to operate when the upper winding thereof is subsequently energized, the test relay R230 being of the polarized type.

The operator at the calling switchboard 210 operates the dial front key K275' and then proceeds to dial the first digit of the directory number of the called subscriber substation T601 by appropriately manipulating the finger wheel of the dial D270'. When the finger wheel of the dial D270' is operated away from its normal position, the off-normal contacts 272' are operated completing a circuit including the first contacts of the dial front key K275' for operating the dial relay R260'. Upon operating the dial relay R260' completes, at the contacts 261', a circuit, including the impulse contacts 271' of the dial D270', for operating the pulse relay R240'. Also the dial relay R260' completes, at the contacts 262', a path, including the second contacts of the dial front key K275', the contacts 241' and the resistor 267' for applying battery potential to the sleeve of the front plug P212'; and interrupts, at the contacts 263', the previously traced circuit for energizing in series the winding of the front supervisory relay R250' and the winding of the pulse relay R240. Accordingly, the front supervisory relay R250' restores and the pulse relay R240' is retained in its operated position via the alternative circuit for energizing the winding thereof, including the EC conductor C224 of the incoming trunk 220, the contacts 241' of the operated pulse relay R240' and the resistor 267'. Subsequently, when the finger wheel of the dial D270' is released, the impulse contacts 271' thereof are opened and then closed repeatedly a number of times in accordance with the impulses of the first digit of the directory number of the called subscriber substation T601. Accordingly, the dial D270' transmits, at the impulse contacts 271' thereof, the impulses of the present digit causing the pulse relay R240' to follow. During the transmission of the impulses of the present digit, the off-normal contacts 272' of the dial D270' are retained in their closed position retaining operated the dial relay R260'. Upon restoring the front supervisory relay R250' interrupts, at the contacts 251' the circuit for illuminating the front supervisory lamp L266'; however, without effect at this time.

Accordingly, the pulse relay R240' following the impulses of the present digit alternately transmits battery and ground potentials, at the contacts 241' and 242', over the sleeve of the front plug P212' and consequently the EC conductor C224 of the incoming trunk 220; whereby the pulse relay R240 follows. More particularly, each time the pulse relay R240' restores, it interrupts, at the contacts 241', the path for connecting battery potential to the sleeve of the front plug P212'; and completes, at the contacts 242', a substantially identical path for connecting ground potential to the sleeve of the front plug P212'; whereby the winding of the pulse relay R240 is deenergized and then short-circuited causing the latter relay to restore after a very brief time interval. Conversely, each time the pulse relay R240' operates, it interrupts, at the contacts 242', the path for connecting ground potential; and recompletes, at the contacts 241', the path for connecting battery potential to the sleeve of the front plug P212'; whereby the pulse relay R240 reoperates. Each time the pulse relay R240 restores and then reoperates, it interrupts and then recompletes, at the contacts 241, the circuit for retaining operated the hold relay R250; whereby the latter relay is retained in its operated position during impulsing as it is of the slow-to-release type. Also each time the pulse relay R240 restores and then reoperates, it completes and then interrupts, at the contacts 242, a circuit, including the contacts 235, 254 and 263, for energizing the lower winding of the transfer relay R260 and for operating the vertical magnet M275; whereby the transfer relay R260 is retained in its operated position during impulsing as it is of the slow-to-release type; and the vertical magnet M275 is operated repeatedly in order to drive the wiper carriage of the Strowger mechanism step by step in the vertical direction.

At the conclusion of the first digit, when the finger wheel of the dial D270' is returned to its normal position, the impulse contacts 271' are retained in closed position retaining operated the pulse relay R240'; and the off-normal contacts 272' are opened in order to cause the dial relay R260' to restore shortly thereafter, the latter relay being of the slow-to-release type. Upon restoring the dial relay R260' recompletes, at the contacts 263', the previously traced series circuit for energizing the winding of the front supervisory relay R250' and the winding of the pulse relay R240, thereby to effect reoperation of the front supervisory relay R250' and to retain the pulse relay R240 in its operated position. Upon reoperating the front supervisory relay R250' again completes, at the contacts 251', the circuit for illuminating the front supervisory lamp L266' in order again to indicate that the present call extended via the front plug P212' has not been answered. When the wiper carriage of the Strowger mechanism is driven one step in the vertical direction away from its normal vertical position, the sets of switch springs S279, S280 and S281 are operated. More particularly, the set of switch springs S279 is operated in order to interrupt the circuit for energizing the upper winding of the transfer relay R260. Accordingly, shortly following the conclusion of the first digit, the pulse relay R260 being retained in its operated position, the transfer relay R260 restores, as it is of the slow-to-release type. Upon restoring the transfer relay R260 interrupts, at the contacts 263, a further point in the multiple circuit for energizing the lower winding thereof and for operating the vertical magnet M275; and completes, at the contacts 264, a circuit, including the contacts 277, the set of switch springs S280 and the contacts 241 and 235, for operating the rotary magnet M276. Upon operating the rotary magnet M276 drives the wiper carriage of the Strowger mechanism one step in the rotary direction; and interrupts, at the contacts 277, the operating circuit therefor. Accordingly, the rotary magnet M276 restores in order to recomplete, at the contacts 277, the operating circuit therefor. Thus the rotary magnet M277 operates buzzer fashion in order to drive the wiper carriage of the Stowger mechanism step by step in the rotary direction; whereby the test relay R230 tests the idle or busy condition of the individual incoming trunks in the previously selected group, including the incoming trunk 310 extending to the repeater 300; the group of incoming trunks, including the incoming trunk 310, being selected by the Strowger mechanism in response to the first digit. More particularly, when the wiper set of the Strowger mechanism selects the first trunk in the group mentioned, the idle or busy condition thereof is tested by the test relay R230 via a path extending from ground, at the contacts 251, and including the upper winding of the test relay R230 and the contacts 252 and 262 and the control wiper 273 of the wiper set. Specifically, in the event that the first trunk mentioned is busy, ground potential appears upon the control conductor thereof completing a substantially identical path for short-circuiting the upper winding of the test relay R230; whereby the latter relay remaining in its restored position, permits continued operation of the rotary magnet M276 in the manner previously described.

Now assuming that the incoming trunk 310 is the first idle trunk in the group mentioned, battery potential appears upon the control conductor C313 thereof via a path including the contacts 331 and 341 and the upper winding of the seize relay R340 in the repeater 300. Accordingly, when the wiper set of the Strowger mechanism selects the incoming trunk 310, a circuit substantially identical to that previously traced is completed for energizing the upper winding of the test relay R230 in the selector 200 causing the latter relay to operate exceedingly fast as it is of the polarized type. Upon operating the test relay R230 interrupts, at the contacts 235, the circuit for operating the rotary magnet M276 in order positively to prevent further operation in the rotary direction of the wiper set of the Strowger mechanism. Also the test relay R230 completes, at the contacts 232, a holding circuit, including the grounded control conductor C223 of the incoming trunk 220, for energizing the intermediate winding thereof; and interrupts, at the contacts 235, a multiple circuit for energizing the winding of the hold relay R250 in order to cause the latter relay to restore shortly thereafter, it being of the slow-to-release type. Also the test relay R230 interrupts, at the contacts 234, the circuit for retaining operated the pulse relay R240; and completes, at the contacts 233, a connection between the EC conductor C224 of the incoming trunk 220 and the EC wiper 274 of the Strowger mechanism. Also the test relay R230 completes, at the contacts 231, a path, including the contacts 262, for applying ground potential to the control wiper 273 of the Strowger mechanism; and completes, at the contacts 236 and 237, connections between the line conductors C221 and C222 of the incoming trunk 220 and the line wipers 271 and 272 of the Strowger mechanism.

At this time, direct ground potential is applied via the control wiper 273 of the Strowger mechanism to the control conductor C313 of the incoming trunk 310 completing a circuit, including the contacts 331 and 341, for energizing the upper winding of the seize relay R340 in the repeater 300 in order to cause the latter relay to operate. Upon operating the seize relay R340 interrupts, at the contacts 341, a path, including the contacts 331 and 332 for short-circuiting the lower winding thereof; whereby the upper and lower windings of the seize relay R340 are energized in series via the contacts 332 from the control conductor C313 of the incoming trunk 310 in order to retain the seize relay R340 in its operated position. Also the seize relay R340 completes, at the contacts 343, a connection between the EC conductor C314 of the incoming trunk 310 and the lower winding of the supervisory relay R350. More particularly, at this time, the upper winding of the supervisory relay R350 is short-circuited via a path including the contacts 377; and the lower winding of the supervisory relay R350 is energized in series with the winding of the front supervisory relay R250′ over the previously traced circuit, including the EC conductor C314 of the incoming trunk 310 and the EC conductor C224 of the incoming trunk 220. When this series circuit is completed the front supervisory relay R250′ is retained in its operated position and the supervisory relay R350 is operated. Specifically, the supervisory relay R350 is operated since the lower winding thereof is energized and the upper winding thereof is short-circuited, the supervisory relay R350 being of the differential type. Upon operating the supervisory relay R350 interrupts, at the contacts 351, a normally completed path, including the contacts 372 and the impedance element 378, for short-circuiting the upper winding of the signal relay R375; and interrupts, at the contacts 351, a multiple path, including the contacts 372 and the intermediate winding of the signal relay R375, for applying ground potential to the simplex conductor C385. Also upon operating the supervisory relay R350 completes, at the contacts 352, a circuit, including the resistor 353, the contacts 372 and the impedance element 378, for energizing the upper winding of the signal relay R375; and a multiple path, including the contacts 372, for applying battery potential by way of the resistor 353 and the intermediate winding of the signal relay R375 to the simplex conductor C385. The simplex conductor C385 is connected via the windings 383 and 384 of the repeating coil 380 and the line conductors of the trunk 390 and the windings 483 and 484 of the repeating coil 480 to the simplex conductor C485; which simplex conductor C485 is connected via the intermediate winding of the signal relay R475 in the repeater 400 and the contacts 472 and 451 to ground potential. Accordingly, the intermediate windings of the signal relays R375 and R475 are energized in series circuit relation. Also the upper winding of the signal relay R475 is short-circuited via a path, including the contacts 451 and 472 and the impedance element 478. Further the lower winding of the signal relay R375 is energized by the voltage drop developed across the resistor 391 included in the potentiometer circuit; and the lower winding of the signal relay R475 is energized by the voltage drop developed across the resistor 491 included in the potentiometer circuit.

Accordingly, at this time the upper and lower windings of the signal relay R375 are energized in cumulative relation and in opposition to the intermediate winding thereof; whereby the signal relay R375 does not operate. On the other hand, the upper winding of the signal relay R475 is short-circuited while the intermediate and lower windings thereof are energized in opposing relation; however since the intermediate winding of the signal relay R475 predominates over the lower winding thereof the signal relay R475 operates. Upon operating the signal relay R475 interrupts, at the contacts 477, a normally completed path for short-circuiting the upper winding of the supervisory relay R450 and a multiple path including the lower winding of the supervisory relay R450 and the contacts 444 for applying ground potential to the EC conductor C424 of the incoming trunk 420 extending to the incoming selector 500. Further the signal relay R475 completes, at the contacts 476, a circuit for energizing the upper winding of the supervisory relay R450 in series with the winding of the control relay R445, and a multiple path for applying battery potential by way of the winding of the control relay R445, the lower winding of the supervisory relay R450 and the contacts 444 to the EC conductor C424 of the incoming trunk 420. At this time ground potential in the incoming selector 500 is connected via the winding of the pulse relay R540 therein and the contacts 534 to the EC conductor C424 of the incoming trunk 420. Accordingly, the lower winding of the supervisory relay R450 in the repeater 400 is energized in series with the winding of the pulse relay R540 in the incoming selector 500; whereby the pulse relay R540 operates. However, the supervisory relay R450 does not operate since both the upper and lower windings thereof are energized and this relay is of the differential type.

Upon operating the control relay R445 completes, at the contacts 446, a circuit, including the contacts 442, for operating the busy relay R430. Upon operating the busy relay R430 interrupts, at the contacts 431, a path, including the contacts 441, for applying battery potential via the upper winding of the seize relay R440 to the control conductor C413 of the incoming trunk 410; interrupts, at the contacts 431 and 432, a normally completed path for short-circuiting the lower winding of the seize relay R440; and completes, at the contacts 443, a path for applying ground potential to the control conductor C413 of the incoming trunk 410. This application of ground potential to the control conductor C413 marks the incoming trunk 410 and consequently the repeater 400 as busy to the selectors 521, etc., having access thereto. Also, the busy relay R430 completes, at the contacts 434, a path for applying ground potential to the control conductor C423 of the outgoing trunk 420, thereby to complete a circuit including the set of switch springs S579 for energizing the upper winding of the transfer relay R560 in the incoming selector 500 in order to cause the latter relay to operate. Upon operating the pulse relay R540 completes, at the contacts 541, a circuit, including the contacts 535, for operating the hold relay R550. Upon operating the hold relay R550 completes, at the contacts 551, a multiple path for applying ground potential to the control conductor C423 of the outgoing trunk 420; and completes, at the contacts 553, a circuit for energizing the lower winding of the test relay R530 in order to render the latter relay exceedingly fast to operate when the upper winding thereof is subsequently energized, it being of the polarized type. At this time the selector 200 has responded to the first digit of the directory number of the called subscriber substation T601 dialed at the calling switchboard 210 to select the incoming trunk 310 extending to the repeater 300; the repeater 300 has seized the repeater 400 over the trunk 390; and the repeater 400 has seized the incoming selector 500 over the outgoing trunk 420. Accordingly, the incoming selector 500 is in readiness to receive the second digit of the directory number of the called subscriber substation T601.

The operator at the calling switchboard 210 then proceeds to dial the second digit of the directory number of the called subscriber substation T601; whereby the dial D270' in the cord circuit 210' transmits alternate battery and ground impulses over the sleeve of the front plug P212' in the manner previously explained. More particularly, each time battery potential is removed from and ground potential is applied to the sleeve of the front plug P212' and consequently to the EC conductor C224 of the incoming trunk 220, the previously traced circuit for energizing the lower winding of the supervisory relay R350 is interrupted and a substantially identical path for short-circuiting the lower winding of the supervisory relay R350 is completed, causing the latter relay to restore after a very brief time interval. Conversely, each time ground potential is removed from and battery potential is applied to the sleeve of the front plug P212' and consequently the EC conductor C224 of the incoming trunk 220, the path for short-circuiting the lower winding of the supervisory relay R350 is interrupted and the circuit for energizing the lower winding of the supervisory relay R350 is completed; whereby the latter relay operates. Accordingly, the supervisory relay R350 follows the impulses of the second digit dialed at the calling switchboard 210. Each time the supervisory relay R350 restores, it interrupts, at the contacts 352, the circuit for energizing the upper winding of the signal relay R375 and the multiple circuit for energizing the intermediate winding of the signal relay R375 in series with the intermediate winding of the signal relay R475; and completes, at the contacts 351 the path for short-circuiting the upper winding of the signal relay R375 and the multiple path for short-circuiting the intermediate winding of the signal relay R375 in series with the intermediate winding of the signal relay R475. Accordingly, the signal relay R375 is retained in its restored position and the signal relay R475 follows the impulses of the present digit. Each time the signal relay R475 restores, it interrupts, at the contacts 476, the circuit for energizing the winding of the control relay R445 in series with the upper winding of the supervisory relay R450 and the multiple circuit for energizing the winding of the control relay R445 in series with the lower winding of the supervisory relay R450 and the winding of the pulse relay R540; and completes, at the contacts 477, the path for short-circuiting the upper winding of the supervisory relay R450 and the multiple path for short-circuiting the lower winding of the supervisory relay R450 in series with the winding of the pulse relay R540; whereby the supervisory relay R450 is retained in its restored position and the control relay R445 restores and the pulse relay R540 restores after a very brief time interval. Conversely, each time the signal relay R475 operates, it interrupts, at the contacts 477, the path for short-circuiting the upper winding of the supervisory relay R450 and the multiple path for short-circuiting the lower winding of the supervisory relay R450 in series with the winding of the pulse relay R540; and recompletes, at the contacts 476, the circuit for energizing the winding of the control relay R445 in series with the upper winding of the supervisory relay R450 and the multiple circuit for energizing the winding of the control relay R445 in series with the lower winding of the supervisory relay R450 and the winding of the pulse relay R540 in order to retain the supervisory relay R450 in its restored position and to effect operation of the control relay R445 and the pulse relay R540. Thus the signal relay R475 repeats to the control relay R445 and the pulse relay R540; whereby the relays mentioned follow the impulses of the present digit. Each time the control relay R445 restores and then reoperates it interrupts and then recompletes, at the contacts 446, the circuit for retaining operated the busy relay R430; whereby the latter relay is retained in its operated position during impulsing as it is of the slow-to-release type. Each time the pulse relay R540 restores and then reoperates, it interrupts and then recompletes, at the contacts 541, the circuit for retaining operated the hold relay R550; whereby the latter relay is retained in its operated position during impulsing as it is of the slow-to-release type. Also each time the pulse relay R540 restores and then reoperates, it completes and then interrupts, at the contacts 542, a circuit, including the contacts 535, 554 and 563, for energizing the lower winding of the transfer relay R560 and a multiple circuit for operating the vertical magnet M575.

The remainder of the operation of the incoming selector 500 in response to the second digit of the directory number of the called subscriber substation T601 is essentially the same as that of the selector 200 previously described. Specifically, the wiper set of the Strowger mechanism in the incoming selector 500 is operated to the level of the group of trunks in the associated contact bank including the incoming trunk 610 extending to the toll selector repeater 600. At the conclusion of the present digit the pulse relay R540 is retained in its operated position and shortly thereafter, the transfer relay R560 restores effecting operation of the rotary magnet M576. As the wiper set of the Strowger mechanism is rotated the individual incoming trunks in the group, including the incoming trunk 610, are tested by the test relay R530; and when an idle trunk in this group is selected by the wiper set the test relay R530 is operated to effect the restoration of the pulse relay R540 and the restoration of the hold relay R550 shortly thereafter, the latter relay being of the slow-to-release type. Assuming that the incoming trunk 610 is the first idle trunk in the group mentioned when it is selected by the wiper set of the Strowger mechanism, the test relay R530 is operated as previously noted. Upon operating the test relay R530 interrupts, at the contacts 535, the operating circuit for the rotary magnet M576 and the circuit for retaining operated the hold relay R550; interrupts, at the contacts 534, the circuit for retaining operated the pulse relay R540; and completes, at the contacts 532, a holding circuit including the grounded control conductor C423 of the out-going trunk 420, for energizing the intermediate winding thereof. Also the rest relay R530 completes, at the contacts 531, a path for applying ground potential via the contacts 562 to the control wiper 573; completes, at the contacts 533, a connection between the EC conductor C424 of the outgoing trunk 420 and the EC wiper 574; and completes, at the contacts 536 and 537, connections between the line conductors C421 and C422 of the outgoing trunk 420 and the line wipers 571 and 572.

The application of ground potential to the control wiper C573 completes a circuit, including the control conductor C613 of the incoming trunk 610 and the set of switch springs S688, for energizing the upper winding of the transfer relay R640 in order to cause the latter relay to operate. At this time ground potential is connected via the contacts 643 and 654 to the junction between the upper and lower windings of the pulse relay R630, the other terminal of the upper winding of the pulse relay R630 being connected to ground potential and the other terminal of the lower winding of the pulse relay R630 being connected to the EC conductor C614 of the incoming trunk 610. Accordingly, a path is completed for short-circuiting the upper winding of the pulse relay R630; and a circuit is completed for energizing the lower winding of the pulse relay R630 in series with the lower winding of the supervisory relay R450 and the winding of the control relay R445. Accordingly, the pulse relay R630 in the toll selector repeater 600 is operated; the supervisory relay R450 in the repeater 400 is retained in its restored position; and the control relay R445 in the repeater 400 is retained in its operated position. Upon operating the pulse relay R630 completes, at the contacts 631, a circuit for operating the hold relay R635. Upon operating the hold relay R635 completes, at the contacts 636, a multiple path for applying ground potential to the control conductor C613 of the incoming trunk 610; and completes, at the contacts 638, a circuit for energizing the lower winding of the test relay R620 in order to render the latter relay exceedingly fast to operate when the upper winding thereof is subsequently energized, the test relay R620 being of the polarized type. At this time the incoming selector 500 has responded to the second digit of the directory number of the called subscriber substation T601 to select the toll selector repeater 600 via the incoming trunk 610; and the toll selector repeater 600 is conditioned to respond to the third digit of the directory number of the called subscriber substation T601.

The operator at the calling switchboard 210 then proceeds to dial the third digit of the directory number of the called substcriber substation T601; whereby the supervisory relay R350 follows repeating to the signal relay R475; and the signal relay R475 follows repeating to the control relay R445 and to the pulse relay R630. During impulsing the signal relay R375 and the supervisory relay R450 are retained in their restored positions. Specifically, the signal relay R475 applies alternately battery and ground potential via the previously traced path to the EC conductor C424 of the outgoing trunk 420 and consequently to the EC conductor C614 of the incoming trunk 610. Each time battery potential is removed from and ground potential is applied to the EC conductor C614, the circuit for energizing the lower winding of the pulse relay R630 is interrupted and a substantially identical path for short-circuiting the lower winding thereof is completed; whereby the pulse relay R630 restores after a very brief time interval. Conversely, each time ground potential is removed from and battery potential is applied to the EC conductor C614, the path for short-circuiting the lower winding of the pulse relay R630 is interrupted and the circuit for energizing the lower winding thereof is completed; whereby the pulse relay R630 operates. Accordingly, the pulse relay R630 follows the impulses of the present digit.

Each time the pulse relay R630 restores and then reoperates, it interrupts and then recompletes, at the contacts 631, the circuit for retaining operated the hold relay R635; whereby the latter relay is retained in its operated position during impulsing as it is of the slow-to-release type. Also each time the pulse relay R630 restores and then reoperates, it completes and then interrupts, at the contacts 632, a circuit, including the contacts 639, for energizing the lower winding of the transfer relay R640, and a multiple circuit, also including the contacts 624, for operating the vertical magnet M684. Accordingly, the transfer relay R640 is retained in its operated position during impulsing as it is of the slow-to-release type and the vertical magnet M684 is operated intermittently in order to drive the wiper carriage of the Strowger mechanism step by step in the vertical direction. When the wiper carriage of the Strowger mechanism is driven one step in the vertical direction away from its normal vertical position, the sets of switch springs S688, S689 and S690 are operated. More particularly, the set of switch springs S688 is operated in order to interrupt the circuit for energizing the upper winding of the transfer relay R640. At this time the toll selector repeater 600 is controlled to cause the wiper set to select the group of trunks, including the trunk 605 extending to the toll connector 603, the group of toll connectors, including the toll connector 603, having access to the group of subscriber lines including the subscriber line 602 extending to the called subscriber substation T601. Also at this time the set of switch springs S693 is operated since the wiper carriage is driven in the vertical direction away from its normal vertical position to select the group of trunks, including the trunk 605, as the present call is a local call. Specifically, the set of switch springs S693 is operated to open the first contacts thereof included in a circuit for operating the toll relay R650 and to close the second contacts thereof included in a circuit for operating the local relay R645.

At the conclusion of the third digit, the supervisory relay R350 is retained in its operated position retaining operated the signal relay R475; whereby the control relay R445 and the pulse relay R630 are retained in their operated positions. The operated pulse relay R630 causes the transfer relay R640 to restore shortly thereafter, it being of the slow-to-release type. Upon restoring the transfer relay R640 completes, at the contacts 644, a circuit, including the contacts 686, the set of switch springs S689 and the contacts 621' and 631, for operating the rotary magnet M685. Upon operating the rotary magnet M685 drives the wiper carriage of the Strowger mechanism one step in the rotary direction away from its normal rotary position; and interrupts, at the contacts 686, the operating circuit therefor. Accordingly, the rotary magnet M685 restores in order to recomplete, at the contacts 686, the operating circuit therefor. Thus the rotary magnet M685 operates buzzer fashion in order to drive the wiper set of the Strowger mechanism step by step in the rotary direction; whereby the successive trunks in the group, including the trunk 605, is tested by the test relay R620. First assuming that all of the trunks in the group mentioned and preceding the trunk 605 are busy, ground potential appears upon the control conductors thereof; whereas battery potential appears upon the control conductor C698 of the idle trunk 605. And the wiper set selects each of the busy trunks, a path, including the control wiper 683, the contacts 642 and 637 and the grounded control conductor C613 of the incoming trunk 610, is completed for short-circuiting the upper winding of the test relay R620, thereby positively to prevent operation of the latter relay. However, when the wiper set selects the trunk 605 battery potential appearing upon the control conductor C608 thereof completes a substantially identical circuit for energizing the upper winding of the test relay R620; whereby the latter relay operates exceedingly fast as it is of the polarized type. Upon operating the test relay R620 interrupts, at the contacts 621', the circuit for operating the rotary magnet M685; and completes, at the contacts 622, a holding circuit, including the grounded control conductor C613 of the incoming trunk 610, for energizing the intermediate winding thereof. Also the test relay R620 interrupts, at the contacts 624, a further point in the circuit for operating the vertical magnet M684; and completes, at the contacts 621, a path, including the contacts 642, for applying ground potential to the control wiper 683 and consequently to the control conductor C608 of the trunk 605.

The application of ground potential to the control conductor C608 of the trunk 605 effects seizure of the toll conector 603. Also, at this time the operated hold relay R635 completes, at the contacts 636, a circuit for energizing the upper winding of the local answer relay R665 rendering the latter relay fast to operate when the lower winding thereof is subsequently poled in a predetermined direction, the local answer relay R665 being of the polarized type. Moreover, at this time the operated pulse relay R630 completes, at the contacts 633, a circuit, including the line wipers 681, 682, the contacts 671, 674, the windings 628, 629 of the repeating coil 625 and the contacts 657, for bridging the lower winding of the local answer relay R665 across the line conductors C606 and C607 of the trunk 605 extending to the toll connector 603. Specifically, the line relay in the toll connector 603 is energized in series with the lower winding of the local answer relay R665 via the above-traced circuit; however, the direction of current in this circuit is not in the predetermined direction mentioned to pole the local answer relay R665 to operate. In other words, the local answer relay R665 is retained in its restored position although the line relay in the toll connector 603 is operative rendering the toll connector 603 responsive to the next two digits dialed at the calling switchboard 210. Accordingly, at this time the toll selector repeater 600 has operated in response to the third digit of the directory number of the called subscriber substation T601 in order to select the trunk 605 extending to the toll connector 603, and the toll connector 603 is conditioned for operation.

The operator at the calling switchboard 210 then proceeds to dial the fourth and fifth digits of the directory number of the called subscriber substation T601, which digits are repeated between the repeaters 300 and 400 and then by the repeater 400 to the toll selector repeater 600 in a manner identical to that described above in conjunction with the transmission of the third digit of the directory number of the called subscriber substation T601 to the toll selector repeater 600. Specifically, the pulse relay R630 first follows the impulses of the fourth digit mentioned retaining the hold relay R635 in its operated position during impulsing and effecting operation of the transfer relay R640 at the beginning of impulsing and retaining the transfer relay R640 in its operated position during impulsing. Upon reoperating the transfer relay R640 completes, at the contacts 641, an alternative path, including the contacts 638, for applying ground potential to the control wiper 683; and interrupts, at the contacts 642, the original path for applying ground potential to the control wiper 683. Also the transfer relay R640 completes, at the contacts 641', a direct path, including the windings 628 and 629 of the repeating coil 625 and the contacts 657, for short-circuiting the lower winding of the local answer relay R665 in order positively to prevent operation of the latter relay during impulsing and to improve the impulsing circuit via the line wipers 681 and 682 between the toll selector repeater 600 and the toll connector 603. Moreover, each time the pulse relay R630 restores and then reoperates, it interrupts and then recompletes, at the contacts 633, the loop circuit extending via the line conductors C606 and C607 of the trunk 605 to the toll connector 603; whereby the line relay in the toll connector 603 follows the impulses of the present digit.

At the conclusion of the fourth digit of the directory number of the called subscriber substation T601, the pulse relay R630 is again retained in its operated position; whereby the transfer relay R640 restores shortly thereafter, it being of the slow-to-release type. Upon restoring, the transfer relay R640 recompletes, at the contacts 642, the original path for applying ground potential to the control wiper 683; and interrupts, at the contacts 641, the alternative path for applying ground potential to the control wiper 683. Also the transfer relay R640 interrupts, at the contacts 641', the path for short-circuiting the lower winding of the local answer relay R665; whereby the lower winding of the local answer relay R665 is again inserted in the loop circuit with the line relay in the toll connector 603. However, the local answer relay R665 is not operated at this time as the lower winding thereof is not properly poled. Accordingly, the toll selector repeater 600 responded to the fourth digit of the directory number of the called subscriber substation T601 received over the EC conductor C614 of the incoming trunk 610 and repeated this digit over the loop circuit including the line conductors C606 and C607 of the trunk 605 to the line relay in the toll connector 603. In a similar manner the toll selector repeater 600 receives and repeats the fifth digit of the directory number of the called subscriber substation T601. The toll connector 603 responds to the fourth and fifth digits mentioned in a conventional manner to select the subscriber lines 602 extending to the called subscriber substation T601. The subsequent operation of the toll connector 603 is governed by the idle or busy condition of the called subscriber substation T601 at this time in a conventional manner.

First assuming that the called subscriber substation T601 is idle at this time, the toll connector 603 operates to project ringing current over the subscriber line 602 and to return ring-back tone current over the line conductors C606 and C607 of the trunk 605. This ring-back tone current received over the line conductors of the trunk 605 is repeated by the repeating coil 625 over the line conductors of the incoming trunk 610 and consequently over the line conductor of the outgoing trunk 420; which ring-back tone current is repeated by the repeating coil 480 over the trunk 390 and then repeated by the repeating coil 380 over the line conductors of the incoming trunk 310 and consequently over the line conductors of the incoming trunk 220 to the cord circuit 210' and accordingly to the headset 263' at the calling switchboard 210 indicating to the operator thereat that the called subscriber substation T601 is being rung at this time.

When the subscriber at the called subscriber substation T601 answers the call, the toll connector 603 operates to reverse the polarity over the loop circuit, including the line conductors C606 and C607 of the trunk 605; whereby the lower winding of the local answer relay R665 is poled to operate. Upon operating the local answer relay R665 completes, at the contacts 666, a circuit, including the second contacts of the set of switch springs S693 for operating the local relay R645. Upon operating the local relay R645 completes, at the contacts 646, a holding circuit, including the grounded control conductor C613 of the incoming trunk 610, for energizing the winding thereof. Also the local relay R645 interrupts, at the contacts 648, the path for connecting ground potential to the junction between the upper and lower windings of the pulse relay R630; and completes, at the contacts 647, a circuit including the contacts 654, 668 and 623, for energizing the lower winding of the transfer relay R640 in series with the upper winding of the pulse relay R630 and a multiple path for applying battery potential by way of the lower winding of the transfer relay R640 and the lower winding of the pulse relay R630 to the EC conductor C614 of the incoming trunk 610. At this time the upper winding of the pulse relay R630 is no longer short-circuited, but rather it is energized in series with the lower winding of the transfer relay R640; whereby the pulse relay R630 is retained in its operated position. However, the transfer relay R640 is not operated when the lower winding thereof is thus energized in series with the upper winding of the pulse relay R630 since the transfer relay R640 is of the marginal type. Moreover, the application of battery potential via the lower winding of the transfer relay R640 and the lower winding of the pulse relay R630 completes a series path for short-circuiting the lower winding of the pulse relay R630 in series with the lower winding of the supervisory relay R450. Specifically, the winding of the control relay R445 is energized in series with the upper winding of the supervisory relay R450 retaining the control relay R445 in its operated position; and the upper winding of the pulse relay R630 is energized in series with the lower winding of the transfer relay R640, retaining the pulse relay R630 in its operated position but preventing operation of the transfer relay R640 as it is of the marginal type. However, the intermediate voltage developed at the junction of the upper and lower windings of the pulse relay R630 substantially matches the intermediate voltage developed at the junction of the upper and lower windings of the supervisory relay R450; whereby the lower winding of the pulse relay R630 and the lower winding of the supervisory relay R450 are effectively short-circuited in series as previously noted. Accordingly, since the supervisory relay R450 is of the differential type, it operates at this time, the upper winding thereof being energized and the lower winding thereof being short-circuited. Upon operating the supervisory relay R450 interrupts, at the contacts 451, the path for short-circuiting the upper winding of the signal relay R475 and the multiple circuit for energizing the intermediate winding of the signal relay R475 in series with the intermediate winding of the signal relay R375. Also the supervisory relay R450 completes, at the contacts 452, a circuit, including the resistor 453, the contacts 472 and the impedance element 478, for energizing the upper winding of the signal relay R475 and a multiple path for short-circuiting the intermediate winding of the signal relay R475 in series with the intermediate winding of the signal relay R375. Accordingly, at this time, the intermediate winding of the signal relay R475 is short-circuited and the upper and lower windings thereof are energized in cumulative relation retaining the signal relay R475 in its operated position. Similarly, the intermediate winding of the signal relay R375 is short-circuited and the upper and lower windings thereof are energized in cumulative relation causing the signal relay R375 to operate.

Upon operating the signal relay R375 interrupts, at the contacts 377, the path for short-circuiting the upper winding of the supervisory relay R350 and the multiple circuit for energizing the lower winding of the supervisory relay R350 in series with the winding of the front supervisory relay R250'. Also the signal relay R375 completes, at the contacts 376, a circuit for energizing the winding of the control relay R345 in series with the upper winding of the supervisory relay R350 and a multiple path for short-circuiting the winding of the control relay R345, the lower winding of the supervisory relay R350 and the winding of the front supervisory relay R250' in series circuit relation. At this time the control relay R345 operates and the supervisory relay R350 is retained in its operated position; however the front supervisory relay R250' restores. The operation of the control relay R345 is without particular effect at this time since the seize relay R340 occupies its operated position. However, upon restoring the front supervisory relay R250' interrupts, at the contacts 251', the circuit for illuminating the front supervisory lamp L266', thereby to indicate to the operator at the calling switchboard 210 that the subscriber at the called subscriber substation T601 has answered the call. Also when the toll connector 603 responds to the answering of the call at the called subscriber substation T601, the projection of ringing current over the subscriber line 602 and the return of ring-back tone current over the connection are interrupted. Accordingly, at this time an established connection is completed between the calling switchboard 210 and the called subscriber substation T601; whereby the operator at the calling switchboard 210 may converse with the subscriber at the called subscriber substation T601 and otherwise extend the established connection utilizing the rear plug P211' of the cord circuit 210'; all in a conventional manner. At this time, the operator at the calling switchboard 210 normally restores the dial front key K275' and the talk key K264' extending the connection via the cord circuit 210' and excluding the headset 263' from the established connection.

At the conclusion of the established connection, when the subscriber at the called subscriber substation T601 disconnects, the toll connector 603 operates in order to return the polarity of the loop circuit including the line conductors C606 and C607 of the trunk 605; whereby the lower winding of the local answer relay R665 is poled to restore. Upon restoring the local answer relay R665 interrupts, at the contacts 668, the path for applying battery potential via the lower winding of the transfer relay R640 to the junction between the upper and lower windings of the pulse relay R630; and recompletes, at the contacts 667, the path for connecting ground potential to the junction between the upper and lower windings of the pulse relay R630. At this time the upper winding of the pulse relay R630 is short-circuited and the lower winding thereof is energized in series with the lower winding of the supervisory relay R450; whereby the pulse relay R630 is retained in its operated position and the supervisory relay R450 restores as it is of the differential type, and the upper winding thereof is energized in series with the winding of the control relay R445. Accordingly, the control relay R445 is retained in its operated position; and upon restoring the supervisory relay R450 interrupts, at the contacts 452, the path for applying battery potential to the junction between the upper and lower windings of the signal relay R475; and recompletes, at the contacts 451, the path for applying ground potential to the junction between the upper and lower windings of the signal relay R475. Accordingly, the upper winding of the signal relay R475 is short-circuited and the intermediate winding thereof is energized in opposition to the lower winding thereof but predominates thereover so that the signal relay R475 is retained in its operated position. The intermediate winding of the signal relay R375 is energized in opposition to the cumulative energization of the upper and lower windings thereof; whereby the signal relay R375 restores. Upon restoring the signal relay R375 interrupts, at the contacts 376, the circuit for energizing the winding of the control relay R345 in series with the upper winding of the supervisory relay R350; whereby the control relay R345 restores. Also the signal relay R375 completes, at the contacts 377, the path for short-circuiting the upper winding of the supervisory relay R350 and the circuit for energizing the lower winding of the supervisory relay R350 in series with the winding of the front supervisory relay R250′. Accordingly, the supervisory relay R350 is retained in its operated position and the front supervisory relay R250′ operates. Upon operating the front supervisory relay R250′ completes, at the contacts 251′, the circuit for illuminating the front supervisory lamp L266′ in order to indicate to the operator at the calling switchboard 210 that the subscriber at the called subscriber substation T601 has disconnected.

The operator at the calling switchboard 210 then withdraws the front plug P212′ of the cord circuit 210′ from the jack J220 terminating the incoming trunk 220, thereby to interrupt the circuit for energizing the winding of the front supervisory relay R250′ in series with the lower winding of the supervisory relay R350 causing the relays mentioned to restore. Upon restoring the front supervisory relay R250′ interrupts, at the contacts 251′, the circuit for illuminating the front supervisory lamp L266′. Also when the front plug P212′ is withdrawn from the jack J220 the contacts of the jack J220 are opened to interrupt the circuit for illuminating the busy lamp L220 in order to indicate the idle condition of the incoming trunk 220 and consequently the selector 200 at this time. Also when the contacts of the jack J220 are thus opened the holding circuit for energizing the intermediate winding of the test relay R230 in the selector 200 is interrupted, causing the latter relay to restore. Upon restoring the test relay R230 completes, at the contacts 235, a circuit, including the contacts 242 and 255 and the set of switch springs S281, for operating the release magnet M278. Upon operating the release magnet M278 releases the wiper carriage of the Strowger mechanism causing it to be returned to its normal rotary and vertical positions; whereby the sets of switch springs S279, S280 and S281 are operated. More particularly, the set of switch springs S281 is operated in order to interrupt the circuit for operating the release magnet M278; and the set of switch springs S279 is operated in order to complete the previously traced path for applying battery potential by way of the upper winding of the transfer relay R260 to the control conductor C223 of the incoming trunk 220 in order again to mark the incoming trunk 220 and consequently the selector 200 as idle.

Upon restoring the supervisory relay R350 in the repeater 300 interrupts, at the contacts 352, the path for applying battery potential to the junction between the upper and lower windings of the signal relay R375; and completes, at the contacts 351, the path for applying ground potential to the junction between the upper and lower windings of the signal relay R375. Accordingly, at this time the upper winding of the signal relay R375 is short-circuited and the intermediate winding of the signal relay R375 is short-circuited in series with the intermediate winding of the signal relay R475; whereby the signal relay R375 is retained in its restored position. Since the upper winding of the signal relay R475 is short-circuited and the intermediate winding thereof is now short-circuited, the latter relay restores. Upon restoring the signal relay R475 interrupts, at the contacts 476, the circuit for energizing the winding of the control relay R445 in series with the upper winding of the supervisory relay R450; whereby the control relay R445 restores. Also the signal relay R475 completes, at the contacts 477, the path for short-circuiting the upper winding of the supervisory relay R450 and the multiple path for short-circuiting the lower winding of the supervisory relay R450 in series with the lower winding of the pulse relay R630, thereby to retain the supervisory relay R450 in its restored position and to cause the pulse relay R630 to restore. Upon restoring the control relay R445 interrupts, at the contacts 446, the circuit for retaining operated the busy relay R430 in order to cause the latter relay to restore shortly thereafter, it being of the slow-to-release type. Upon restoring the busy relay R430 interrupts, at the contacts 433, the path for applying ground potential to the control conductor C413 of the incoming trunk 410; and completes, at the contacts 431, the path for applying battery potential by way of the upper winding of the seize relay R440 to the control conductor C413; thereby again to mark the incoming trunk 410 and consequently the repeater 400 as idle to the selectors 521, etc., having access thereto. Also the busy relay R430 interrupts, at the contacts 434, the path for applying ground potential to the control conductor C423 of the outgoing trunk 420 in order to interrupt the holding circuit for energizing the intermediate winding of the test relay R530 causing the latter relay to restore. Upon restoring the test relay R530 completes, at the contacts 535, a circuit, including the contacts 542 and 555 and the set of switch springs S581, for operating the release magnet M578. Upon operating the release magnet M578 releases the wiper carriage of the Strowger mechanism causing it to be returned to its normal rotary and vertical positions; whereby the sets of switch springs S579, S580 and S581 are operated.

More particularly, the set of switch springs S581 is operated in order to interrupt the circuit for operating the release magnet M578; and the set of switch springs S579 is operated in order again to apply battery potential by way of the upper winding of the transfer relay R560 to the control conductor C423 of the outgoing trunk 420.

When the incoming selector 500 is thus released, ground potential is removed therein from the control conductor C613 of the incoming trunk 610; and when the pulse relay R630 restores, it interrupts, at the contacts 631, the circuit for retaining operated the hold relay R635 in order to cause the latter relay to restore shortly thereafter, it being of the slow-to-release type. Upon restoring the hold relay R635 interrupts, at the contacts 636, the multiple path for applying ground potential to the control conductor C613 of the incoming trunk 610, thereby to interrupt the holding circuit for energizing the intermediate winding of the test relay R620 causing the latter relay to restore. Upon restoring the hold relay R635 completes, at the contacts 636′, a circuit, including the contacts 632 and the set of switch springs S690, for operating the release magnet M687. Upon operating the release magnet M687 releases the wiper carriage of the Strowger mechanism causing it to be returned to its normal rotary and vertical positions; whereby the sets of switch springs S688, S689, S690 and S693 are operated. More particularly, the set of switch springs S690 is operated in order to interrupt the circuit for operating the release magnet M687; and the set of switch springs S688 is operated in order to complete the path for applying battery potential by way of the upper winding of the transfer relay R640 to the control conductor C613 of the incoming trunk 610, thereby again to mark the incoming trunk 610 and consequently the toll selector repeater 600 as idle to the incoming selectors 500, etc., having access thereto. Also when ground potential is removed from the control conductor C613 of the incoming trunk 610, the holding circuit for energizing the local relay R645 is interrupted causing the latter relay to restore, and the circuit for energizing the upper winding of the local answer relay R665 is interrupted in order to retain the latter relay in its restored position. When the toll selector repeater 600 is thus released, ground potential is removed from the control conductor C608 of the trunk 605 in order to effect the release of the toll connector 603; whereby battery potential in the toll connector 603 applied to the control conductor C608 of the trunk 605 again marks the trunk 605 and consequently the toll connector 603 as idle to the toll selector repeaters 600, etc., having access thereto. Also when the toll connector 603 is thus released, the line switch associated with the subscriber line 602 again operates in order to mark the called subscriber substation T601 as idle. At this time the established connection between the calling switchboard 210 and the called subscriber substation T601 is released and all of the apparatus involved therein is completely released and available for further use.

Reconsidering the extension of the call from the calling switchboard 210 to the called subscriber substation T601, the selector 200 may respond to the first digit of the directory number of the called subscriber substation T601 and test all of the incoming trunks in the group, including the incoming trunk 310, as busy. In this case operation of the rotary magnet M276 continues; whereby the wiper carriage of the Strowger mechanism is driven eleven steps in the rotary direction away from its normal rotary position operating the sets of switch springs S282, S283 and S284. Upon operating the set of switch springs S282 completes a circuit, including the grounded control conductor C223 of the incoming trunk 220 for energizing the upper winding of the test relay R230 in series with the upper winding of the transfer relay R260, thereby to effect operation of the relays mentioned. Upon operating the test relay R230 interrupts, at the contacts 235, the circuit for operating the rotary magnet M276 in order to arrest further operation thereof and the multiple circuit for retaining operated the hold relay R250, in order to cause the latter relay to restore shortly thereafter, it being of the slow-to-release type. Also the test relay R230 interrupts, at the contacts 234, the circuit for retaining operated the pulse relay R240; and completes, at the contacts 233, a connection between the EC conductor C224 of the incoming trunk 220 and the EC wiper 274. When the set of switch springs S284 is thus operated, the toll busy conductor C285 is connected to the winding of the busy relay R265; and 120 ground impulses per minute appearing upon the toll busy conductor C285 cause corresponding operation and restoration of the busy relay R265. Each time the busy relay R265 operates, it interrupts, at the contacts 266, a path, including the set of switch springs S283, for applying ground potential to the control wiper 274; and completes, at the contacts 267, a path, including the set of switch springs S283, for applying resistance battery potential to the control wiper 274. Conversely, each time the busy relay R265 restores, it opens the contacts 267 and closes the contacts 266; whereby alternate ground and battery impulses are returned over the EC conductor C224 of the incoming trunk 220 in order to bring about corresponding operation and restoration of the front supervisory relay R250′; whereby the latter relay flashes the front supervisory lamp L266′ in a corresponding manner. The flashing of the front supervisory lamp L266′ at 120 times per minute indicates to the operator at the calling switchboard 210 that a toll busy condition has been encountered in the outgoing switch train by the selector 200. The operator at the calling switchboard 210 then withdraws the front plug P212′ from the jack J220 effecting the release of the selector 200 in a manner substantially identical to that previously explained. When the wiper carriage of the Strowger mechanism is thus released, the sets of switch springs S279, S280, S281, S282, S283 and S284 are operated. At this time the set of switch springs S284 is operated in order to effect the restoration of the busy relay R265; and the set of switch springs S283 is operated in order to disconnect ground potential from the EC wiper 274.

In a similar manner the incoming selector 500 may respond to the second digit of the directory number of the called subscriber substation T601 and test all of the trunks in the group, including the incoming trunk 610, as busy. In this case, the wiper carriage of the Strowger mechanism is driven eleven steps in the rotary direction away from its normal rotary position effecting operation of the sets of switch springs S582, S583 and S584 and the consequent intermittent operation of the busy relay R565; whereby the front supervisory lamp L266′ is again flashed 120 times per minute indicating the toll busy condition in the outgoing switch train that has been encountered by the incoming selector 500. At this time the operator at the calling switchboard 210 withdraws the front plug P212' from the jack J220 effecting the release of the apparatus involved in a manner substantially identical to that previously explained.

In a similar manner the toll selector repeater 600 may respond to the third digit of the directory number of the called subscriber substation T601 and test all of the trunks in the group, including the trunk 605, as busy. In this case the wiper carriage of the Strowger mechanism is driven eleven steps in the rotary direction away from its normal rotary position effecting operation of the sets of switch springs S691 and S692. More particularly, the set of switch springs S692 is operated to complete a circuit, including the grounded control conductor C613 of the incoming trunk 610, for energizing the upper winding of the transfer relay R640 in series with the upper winding of the test relay R620; whereby the relays mentioned operate. Upon operating the test relay R620 interrupts, at the contacts 621', the circuit for operating the rotary magnet M685. The set of switch springs S691 is operated to complete a connection between the upper winding of the toll answer relay R660 and the toll busy conductor C676 and a multiple connection, also including the contacts 652, between the winding of the toll relay R650 and the toll busy conductor C676. Since 120 ground impulses per minute are applied to the toll busy conductor C676, the winding of the toll relay R650 is energized upon the first application of ground potential upon the toll busy conductor C676 causing the latter relay to operate and complete, at the contacts 651, a holding circuit, including the grounded control conductor C613 of the incoming trunk 610, for energizing the winding thereof. Also upon operating the toll relay R650 interrupts, at the contacts 652, the connection between the winding thereof and the toll busy conductor C676. The upper winding of the toll answer relay R660 is intermittently energized via the toll busy conductor C676 operating and then restoring in a similar manner. Each time the toll answer relay R660 operates, it interrupts, at the contacts 661, a path, including the contacts 623 and 653, for applying battery potential by way of the lower winding of the transfer relay R640 to the junction between the upper and lower windings of the pulse relay R630; and completes, at the contacts 662, a path, including the contacts 653, for applying ground potential to the junction between the upper and lower windings of the pulse relay R630. Conversely, each time the toll answer relay R660 restores, it opens the contacts 662 and closes the contacts 661; whereby 120 ground and battery impulses per minute are returned over the EC conductor C614 of the incoming trunk 610 causing the front supervisory lamp L266' to be flashed in a corresponding manner indicating the toll busy condition encountered by the toll selector repeater 600. The operator at the calling switchboard 210 then withdraws the front plug P212' from the jack J220 effecting the release of the apparatus involved in a manner substantially identical to that previously explained.

Finally, the toll connector 603 may respond to the fifth digit of the directory number of the called subscriber substation T601 and test the subscriber line 602 extending to the called subscriber substation T601 as busy; whereby the toll connector 603 operates to reverse and restore the polarity of the loop circuit, including the line conductors C606 and C607 of the trunk 605, sixty times per minute; whereby the local answer relay R665 follows, repeating, at the contacts 667 and 668 corresponding ground and battery impulses over the EC conductor C614 in order to bring about corresponding flashing of the front supervisory lamp L266'. Flashing of the front supervisory lamp L266' at sixty times per minute indicates to the operator at the calling switchboard 210, the line busy condition encountered by the toll connector 603. The operator at the calling switchboard 210 then withdraws the front plug P212' from the jack J220 effecting the release of the apparatus involved in a manner substantially identical to that previously explained.

In view of the foregoing it will be understood that a call may be extended from the calling switchboard 510 in the office 20 to a called subscriber substation, such for example, as the called subscriber substation T201 in the office 10 in a substantially identical manner. Specifically, this call may be routed from the calling switchboard 510 via the incoming trunk 520, the selector 521, the incoming trunk 410, the repeater 400, the trunk 390, the repeater 300, the outgoing trunk 320, the incoming selector 205, the incoming trunk 206, the toll selector repeater 204, the trunk 211, the toll connector 203 and the subscriber line 202 to the called subscriber substation T201.

Now assuming that a call is to be extended from the calling switchboard 210 in the office 10 to the called switchboard 510 in the office 20, the connection may first be routed from the calling switchboard 210 via the incoming trunk 220, the selector 200, the incoming trunk 310, the repeater 300, the trunk 390, the repeater 400, the outgoing trunk 420, the incoming selector 500 and the incoming trunk 610 to the toll selector repeater 600 in response to inserting the front plug P212' of the cord circuit 210' into the jack J220 and the subsequent dialing of the first two digits of the directory number of the calling switchboard 510. The operator at the calling switchboard 210 then proceeds to dial the third digit of the directory number of the called switchboard 510; whereby the toll selector repeater 600 responds thereto in a manner substantially identical to that previously explained selecting first the group of trunks, including the trunk 615, and then an idle trunk in the group mentioned. Specifically, the wiper set of the toll selector repeater 600 may select the particular trunk 615 extending to the ring-down trunk circuit 508; whereupon the test relay R620 is operated in the manner previously explained. At this time the set of switch springs S693 is not operated since the wiper carriage of the Strowger mechanism has been driven in the vertical direction to the level in which the group of trunks, including the trunk 615, is terminated and indicating a toll call. Accordingly, when the test relay R620 operates, ground potential is applied via the contacts 621 and 642 and the control wiper 683 to the control conductor C618 of the trunk 615 effecting seizure of the ring-down trunk circuit 508. Also at this time, the previously traced path for bridging the lower winding of the local answer relay R665 across the line wipers 681 and 682 and consequently across the line conductors C616 and C617 of the trunk 615 is completed. Ground and battery potentials in the ring-down trunk circuit 504 are applied to the line conductors C616 and C617 of the trunk 615 of the predetermined polarity; whereby the lower winding of the local answer relay R665 is poled to operate. Upon operating the local answer relay R665 completes, at the contacts 666, a circuit, including the first contacts of the set of switch springs S693, for operating the toll relay R650. Upon operating the toll relay R650 completes, at the contacts 651, a holding circuit, including the grounded control conductor C613 of the incoming trunk 610, for energizing the winding thereof; and interrupts, at the contacts 657, the loop circuit for energizing the lower winding of the answer relay R665 causing the latter relay to restore. Also the toll relay R650 completes, at the contacts 656, a path, including the windings 628, 629 of the repeating coil 625, the contacts 683, the contacts 671, 674 and the line wipers 681, 682 for bridging the lower winding of the toll answer relay R660 across the line conductors C616 and C617 of the trunk 615. The lower winding of the toll answer relay R660 is energized via the loop circuit including the line conductors C616 and C617 of the trunk 615 extending to the ring-down trunk circuit 508 causing the latter relay to operate. Upon operating the toll answer relay R660 completes, at the contacts 662, an alternative path, including the contacts 653, for applying ground potential to the junction between the upper and lower windings of the pulse relay R630, thereby to retain operated the pulse relay R630 and to retain restored the supervisory relay R450. Accordingly, the signal relay R375 is retained in its restored position retaining the supervisory relay R350 and the front supervisory relay R250 in their operated positions; whereby the front supervisory lamp L266' is illuminated indicating to the operator at the calling switchboard 210 that the call has not yet been answered. While the application of ground potential to the control conductor C618 of the trunk 615 marks the trunk 615 as busy to the other toll selector repeaters having access thereto and effects seizure of the ring-down trunk circuit 508, no signal is actually transmitted from the ring-down trunk circuit 508 over the trunk 509 to the called switchboard 510 at this time.

When the operator at the calling switchboard 210 is ready to signal the operator at the called switchboard 510, she operates and then restores the ring front key K265'. When the ring front key K265' is thus operated, there is completed, at the first contacts thereof, a circuit for operating the ring relay R230'; and when the ring key K265' is thus restored, the circuit for retaining operated the ring relay R230' is interrupted causing the latter relay to restore shortly thereafter, it being of the slow-to-release type. Also when the ring key K265' is thus restored, there is completed, at the second contacts thereof, a circuit, including the contacts 231' for operating the ring relay R220'. Upon restoring the ring relay R230' interrupts, at the contacts 231', the circuit for retaining operated the ring relay R220'. Accordingly, the ring relay R220' operates and then restores completing and then interrupting, at the contacts 221' and 222', paths for applying battery potential by way of the resistors 273' and 274' to the tip and the ring of the front plug P212' and consequently to the line conductors C221 and C222 of the incoming trunk 220 and the line conductors C311 and C312 of the incoming trunk 310; whereby the ring control relays R355 and R360 in the repeater 300 operate and then restore. Upon operating and then restoring the ring control relay R360 completes and then interrupts, at the contacts 361, a circuit for energizing the winding of the control relay R345 in series with the upper winding of the supervisory relay R350 and a multiple path for short-circuiting the winding of the control relay R345 in series with the lower winding of the supervisory relay R350 and the winding of the front supervisory relay R250'; whereby the supervisory relay R350 is retained in its operated position and the control relay R345 operates and then restores while the front supervisory relay R250' restores and then reoperates. The operation and subsequent restoration of the control relay R345 is without effect, whereas the restoration and subsequent reoperation of the front supervisory relay R250' effects a flash of the front supervisory lamp L266' indicating that the repeater 300 is responding to the ring control.

When the ring control relay R355 operates and then restores, it completes and then interrupts, at the contacts 356, a circuit for operating the control relay R365; whereby the control relay R365 operates and then restores shortly thereafter, it being of the slow-to-release type. Upon restoring the ring control relay R355 completes, at the contacts 357, a circuit, including the contacts 366, for operating the control relay R370; and upon restoring the control relay R365 interrupts, at the contacts 366, the circuit for retaining operated the control relay R370. Accordingly, the control relay R370 operates and then restores. When the control relay R370 operates, it interrupts, at the contacts 372, the path for applying battery potential to the junction between the upper and lower windings of the signal relay R375; and completes, at the contacts 371, a path for applying ground potential to the junction between the upper and lower windings of the signal relay R375. Conversely, when the control relay R370 restores, it opens the contacts 371 and closes the contacts 372. Accordingly, an impulse of ground potential is transmitted over the trunk 390 causing the signal relay R475 in the repeater 400 to restore and then reoperate. When the signal relay R475 restores and then reoperates, it interrupts and then recompletes, at the contacts 476, the circuit for energizing the winding of the control relay R445 in series with the lower winding of the supervisory relay R450 and the lower winding of the pulse relay R630; and completes, and then interrupts, at the contacts 477, the path for short-circuiting the lower winding of the supervisory relay R450 in series with the lower winding of the pulse relay R630. Accordingly, the supervisory relay R450 is retained in its restored position and the control relay R445 and the pulse relay R630 restore and then reoperate. The restoration and subsequent reoperation of the control relay R445 is without particular effect since the busy rleay R430 is of the slow-to-release type. However, upon restoring and then reoperating the pulse relay R630 completes and then interrupts, at the contacts 632, the circuit for energizing the lower winding of the transfer relay R640 in order to cause the latter relay to operate and remain operated a short time interval as it is of the slow-to-release type. Upon operating the transfer relay R640 completes, at the contacts 643, a circuit, including the contacts 655 for energizing the lower winding thereof in series with the winding of the ring relay R670; thereby to effect operation of the ring relay R670 and further to delay the restoration of the transfer relay R640. The winding of the ring relay R670 is of sufficient high resistance that the lower winding of the transfer relay R640 is not locked in series therewith; rather the transfer relay R640 restores after a time interval interrupting, at the contacts 643, the circuit for energizing the lower winding thereof in series with the winding of the ring relay R670. Accordingly, the ring relay R670 is retained in its operated position for a predetermined time interval and then restores. Upon operating the ring relay R670 interrupts, at the contacts 671 and 674, the previously traced circuit for bridging the lower winding of the toll answer relay R660 across the line conductors C616 and C617 of the trunk 615; and completes, at the contacts 672 and 673, connections between the generator conductor C675 and ground potential and the respective line wipers 681 and 682. When the ring relay R670 restores, it interrupts, at the contacts 672 and 673, the circuit for projecting ringing current over the line conductors C616 and C617 of the trunk 615; and recompletes, at the contacts 671 and 674, the previously mentioned path for bridging the lower winding of the toll answer relay R660 across the line conductors C616 and C617. Accordingly, ringing current is projected over the line conductors C616 and C617 of the trunk 615 for the predetermined time interval mentioned ringing down the ring-down trunk circuit 508; whereby the ring-down trunk circuit 508 transmits a signal over the trunk 509 indicating to the operator at the called operator position 510 that a call is waiting to be answered on the trunk 509.

The operator at the called switchboard 510 answers the call by inserting the rear plug of a cord circuit thereat into the jack terminating the trunk 509; whereby the ring-down trunk circuit 508 is controlled to interrupt the loop circuit extending via the line conductors C616 and C617 of the trunk 615 for energizing the lower winding of the toll answer relay R660 causing the latter relay to restore. Upon restoring the toll answer relay R660 interrupts, at the contacts 662, the path for applying ground potential to the junction between the upper and lower windings of the pulse relay R630; and completes, at the contacts 661, the path for applying battery potential by way of the lower winding of the transfer relay R640 to the junction between the upper and lower windings of the pulse relay R630; whereby the pulse relay R630 is retained in its operated position and the supervisory relay R450 is operated. Upon operating the supervisory relay R450 effects operation of the signal relay R375 and the consequent operation of the control relay R345 and the restoration of the front supervisory relay R250'. Upon restoring the front supervisory relay R250' extinguishes the front supervisory lamp L266' indicating to the operator at the calling switchboard 210 that the operator at the called switchboard 510 has answered the call. At this time, an established connection is completed between the calling switchboard 210 and the called switchboard 510 and the operator at the called switchboard 510 is advised concerning the further extension of the connection.

At the conclusion of the established connection when the operator at the called switchboard 510 withdraws the rear plug of the cord circuit thereat from the jack terminating the trunk 509, the ring-down trunk circuit 508 is controlled to recomplete the loop circuit including the line conductors C616 and C617 of the trunk 615 for energizing the lower winding of the toll answer relay R660 causing the latter relay to operate. Upon operating the toll answer relay R660 interrupts, at the contacts 661, the path for applying battery potential by way of the lower winding of the transfer relay R640 to the junction between the upper and lower windings of the pulse relay R630; and completes, at the contacts 662, the path for applying ground potential to the junction between the upper and lower windings of the pulse relay R630; whereby the pulse relay R630 is retained in its operated position and the supervisory relay R450 is restored. Upon restoring the supervisory relay R450 effects the restoration of the signal relay R375 and the consequent restoration of the control relay R345 and reoperation of the front supervisory relay R250'. Upon reoperating the front supervisory relay R250' again illuminates the front supervisory lamp L266' in order to indicate to the operator at the calling switchboard 210 that the operator at the called switchboard 510 has disconnected.

The operator at the calling switchboard 210 then withdraws the front plug P212' from the jack J220 in order to effect the release of the selector 200, the repeaters 300 and 400, the incoming selector 500 and the toll selector repeater 600 in a manner substantially identical to that previously explained. When the toll selector repeater 600 is thus released, ground potential is removed from the control conductor C618 of the trunk 615; whereby battery potential in the ring-down trunk circuit 508 is again applied to the control conductor C618 marking the trunk 615 and consequently the ring-down trunk circuit 508 as idle to the toll selector repeaters 600, etc., having access thereto. At this time the established connection between the calling switchboard 210 and the called switchboard 510 is released and all of the apparatus involved therein is completely released and available for further use.

In view of the foregoing, it will be understood that a call may be extended from the calling switchboard 510 in the office 20 to the called switchboard 210 in the office 10 in a substantially identical manner. Specifically, this call may be routed from the calling switchboard 510 via the incoming trunk 520, the selector 521, the incoming trunk 410, the repeater 400, the trunk 390, the repeater 300, the outgoing trunk 320, the incoming selector 205, the incoming trunk 206, the toll selector repeater 204, the trunk 207, the ring-down trunk circuit 208 and the trunk 209 to the terminating jack J209 at the called switchboard 210.

Considering now in greater detail the operations of the signal relays R375 and R475 in the repeaters 300 and 400 respectively disposed in the offices 10 and 20 respectively and interconnected by the trunk 390 via the simplex conductors C385 and C485, it will be recalled that the circuits for energizing the upper windings of the signal relays R375 and R475 are respectively locally controlled from the exchange batteries respectively disposed in the offices 10 and 20, while the circuits for selectively energizing and short-circuiting the intermediate windings of the signal relays R375 and R475 are under the joint control of the exchange batteries in the offices 10 and 20, and the circuits for energizing the lower windings of the signal relays R375 and R475 are directly supplied from the voltage generator 362 disposed in the office 10 and independently of the exchange batteries respectively disposed in the offices 10 and 20. Accordingly, it will be understood that the proper operation of the signal relays R375 and R475 is dependent upon a fairly close matching of the potentials of the exchange batteries in the respective offices 10 and 20. However, the exchange batteries respectively disposed in the offices 10 and 20 do not always provide precisely the same voltage due to charge conditions; whereby the negative potential of the exchange battery provided in one of the offices 10 or 20 may in fact be higher than the negative potential of the exchange battery disposed in the other of the offices 10 or 20, resulting in an actual difference of potential between the negative terminals of the exchange batteries respectively disposed in the offices 10 and 20.

In order to understand more fully the consequences of this variation in voltage between the exchange batteries in the offices 10 and 20, it will be assumed that the voltage of the exchange battery in the office 10 is at the normal 48 volts but that the voltage of the exchange battery in the office 20 is somewhat below the normal 48 volts as a consequence of a discharge condition therein, such for example, as 45 volts. Thus since the voltage of the exchange battery in the office 10 is 3 volts higher than that of the exchange battery in the office 20 there is this 3 volts difference of potential between the negative terminals of the exchange batteries in the respective offices 10 and 20, which effects a considerable influence upon the proper operation of the signal relay R475 in the repeater 400 disposed in the office 20 as explained more fully below.

In this event, when the repeater 400 is in a calling condition, the upper winding of the signal relay R475 is short-circuited; the intermediate winding of the signal relay R475 is energized from the high battery potential in the office 10 and the lower winding of the signal relay R475 is energized via the potentiometer conductor C490; whereby the signal relay R475 occupies its operated position, which is proper for the calling condition in the repeater 400. Now when the call is answered the supervisory relay R450 operates disconnecting ground potential from the junction between the upper and intermediate windings of the signal relay R475 and connecting low battery potential thereto; whereby the upper winding of the signal relay R475 is energized with the low battery potential, but the intermediate winding thereof is not short-circuited. In fact, since there is the 3 volts difference of potential between the exchange batteries in the offices 10 and 20 respectively, the intermediate winding of the signal relay R475 is still energized with a small current. Moreover, the energization of the intermediate winding of the signal relay R475 opposes the accumulative action of the upper and lower windings thereof. Accordingly, not only is the upper winding of the signal relay R475 energized with a voltage somewhat below normal, but the intermediate winding thereof is also energized in opposition to the cumulative action of the upper and lower windings of the signal relay R475; whereby there is a tendency for the signal relay R475 to restore at this time; which, of course, is an improper operation. However, this tendency is overcome by the proper energization of the lower winding of the signal relay R475; which proper energization is maintained from the potentiometer circuit including the voltage regulated generator 362 disposed in the office 10.

Now had the lower winding of the signal relay R475 been connected to the exchange battery in the office 20, it too would have been energized with the under voltage; whereby the accumulative action of the upper and lower windings of the signal relay R475, both energized with the under voltage of the exchange battery in the office 20, and both opposed by the energization of the intermediate winding of the signal relay R475, would have resulted in restoration of the latter relay; which of course, is improper operation of the signal relay R475 when the repeater 400 is in the answering condition. Thus it will be understood that the energization of the lower winding of the signal relay R475 from the standard voltage obtained from the potentiometer circuit including the potentiometer conductor C490 is the only circumstance that prevents restoration of the signal relay R475 when the repeater 400 is in the answering condition, when the exchange battery in the office 20 is under voltage.

In view of the foregoing it will be understood that the same tendency or difficulty arises in conjunction with the signal relay R375 in the repeater 300 in the office 10 when the repeater 300 is in the answering condition and the exchange battery in the office 10 is under voltage; which tendency is also overcome in the present arrangement by the energization of the lower winding of the signal relay R375 from the potentiometer circuit including the potentiometer conductor C490 independent of the voltage of the exchange battery in the office 10.

Accordingly, it will be understood that the arrangement comprising the potentiometer circuit for energizing the lower windings of the signal relays in the various pairs of repeaters permits proper control thereof notwithstanding the circumstance that the exchange battery in one of the offices is under voltage.

In view of the foregoing it is apparent that there has been provided in an automatic telephone system, an improved repeater switching arrangement for setting up interexchange calls and incorporating improved facility for insuring proper operation of the repeaters respectively disposed in the different exchanges notwithstanding the circumstance that the voltages of the exchange batteries in the respective exchanges depart somewhat from a standard or matched condition.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a switchboard, a first trunk terminating a first automatic switch, a second trunk terminating a repeater, a trunk line, each of said trunks including a pair of line conductors and a hold conductor and a control conductor, means controllable from said switchboard for seizing said first switch via said first trunk and for holding said first switch over the hold conductor of said first trunk, means then controllable from said switchboard for transmitting digits over the control conductor of said first trunk, means responsive to a digit received over the control conductor of said first trunk for operating said first switch to seize said repeater via said second trunk and to hold said repeater over the hold conductor of said second trunk and to connect the control conductors of said first and second trunks, means responsive to a subsequent digit received over the control conductor of said second trunk for repeating a corresponding digit over said trunk line, and means for completing a connection between said switchboard and said trunk line via the line conductors of said first and second trunk.

2. In a telephone system, a switchboard, a first trunk terminating a first automatic switch, a second trunk terminating a repeater, a trunk line, each of said trunks including a pair of line conductors and a hold conductor and a control conductor, means controllable from said switchboard for seizing said first switch via said first trunk and for holding said first switch over the hold conductor of said first trunk, means then controllable from said switchboard for transmitting digits over the control conductor of said first trunk, means responsive to a digit received over the control conductor of said first trunk for operating said first switch to seize said repeater via said second trunk and to hold said repeater over the hold conductor of said second trunk and to connect the control conductors of said first and second trunks, means responsive to a subsequent digit received over the control conductor of said second trunk for repeating a corresponding digit over said trunk line, means for completing a connection between said switchboard and said trunk line via the line conductors of said first and second trunks, and means responsive to a supervisory control on said trunk line for returning a supervisory signal to said switchboard via the control conductors of said first and second trunks.

3. In a telephone system, a switchboard, a trunk line terminating a repeater, a first trunk terminating a first automatic switch, a second trunk terminating a second automatic switch, a line, each of said trunks including a pair of line conductors and a hold conductor and a control conductor, means controllable from said switchboard for seizing said repeater via said trunk line, means responsive to seizure of said repeater for seizing said first switch via said first trunk and for holding said first switch over the hold conductor of said first trunk, means then controllable from said switchboard for transmitting digits over said trunk line, means responsive to digits received over said trunk line for repeating corresponding digits over the control conductor of said first trunk, means responsive to a digit received over the control conductor of said first trunk for operating said first switch to seize said second switch via said second trunk and to hold said second switch over the hold conductor of said second trunk and to connect the control conductors of said first and second trunks, means responsive to a subsequent digit received over the control conductor of said second trunk for operating said second switch to seize said line, and means for completing a connection between said switchboard and said line via said trunk line and the line conductors of said first and second trunks.

4. In a telephone system, a switchboard, a trunk line terminating a repeater, a first trunk terminating a first automatic switch, a second trunk terminating a second automatic switch, a line, each of said trunks including a pair of line conductors and a hold conductor and a control conductor, means controllable from said switchboard for seizing said repeater via said trunk line, means responsive to seizure of said repeater for seizing said first switch via said first trunk and for holding said first switch over the hold conductor of said first trunk, means then controllable from said switchboard for transmitting digits over said trunk line, means responsive to digits received over said trunk line for repeating corresponding digits over the control conductor of said first trunk, means responsive to a digit received over the control conductor of said first trunk for operating said first switch to seize said second switch via said second trunk and to hold said second switch over the hold conductor of said second trunk and to connect the control conductors of said first and second trunks, means responsive to a subsequent digit received over the control conductor of said second trunk for operating said second switch to seize said line, means for completing a connection between said switchboard and said line via said trunk line and the line conductors of said first and second trunks, and means responsive to a supervisory control on said line for returning a supervisory signal to said switchboard via the control conductors of said first and second trunks and said trunk line.

5. In a telephone system, a switchboard provided with a first supervisory relay having a winding, an automatic switch provided with a pulse relay having a winding, a trunk circuit provided with a second supervisory relay of the differential type having first and second windings, means controllable from said switchboard for seizing said switch via a first trunk including a pair of line conductors and a hold conductor and a control conductor, said switch being held from said switchboard via the hold conductor of said first trunk, means controllable from said switchboard for transmitting impulses over the control conductor of said first trunk to the winding of said pulse relay, means controlled by said pulse relay for operating said switch to seize said trunk circuit via a second trunk including a pair of line conductors and a hold conductor and a control conductor, said trunk circuit being held from said switch via the hold conductor of said second trunk, a normally completed first path shorting the first winding of said second supervisory relay, means controlled by operation of said switch for completing a connection from said switchboard to said trunk circuit via the line conductors of said first and second trunks and for completing a first control circuit for energizing in series the winding of said first supervisory relay and the second winding of said second supervisory relay via the control conductors of said first and second trunks in order to effect operation of said first and second supervisory relays, means responsive to operation of said second supervisory relay for extending the call, means for answering the call, means responsive to answering of the call for interrupting said first path and said first control circuit and for completing a second control circuit for energizing the first winding of said second supervisory relay and for completing a second path for shorting in series the winding of said first supervisory relay and the second winding of said second supervisory relay via the control conductors of said first and second trunks in order to effect restoration of said first supervisory relay and to retain operated said second supervisory relay, and means responsive to restoration of said first supervisory relay for transmitting an answer signal to said switchboard.

6. In a telephone system, a switchboard provided with a first supervisory relay having a winding, a trunk circuit provided with a second supervisory relay of the differential type having first and second windings, means controllable from said switchboard for seizing said trunk circuit via a trunk including a pair of line conductors and a hold conductor and a control conductor, said trunk circuit being held from said switchboard via the hold conductor of said trunk, a normally completed first path shorting the first winding of said second supervisory relay, means controllable from said switchboard for transmitting impulses over the control conductor of said trunk to the second winding of said second supervisory relay, means controlled by said second supervisory relay for extending the call, means for completing a connection from said switchboard to said trunk circuit via the line conductors of said trunk and for completing a first control circuit for energizing in series the winding of said first supervisory relay and the second winding of said second supervisory relay via the control conductor of said trunk in order to effect operation of said first and second supervisory relays, means for answering the call, means responsive to answering of the call for interrupting said first path and said first control circuit and for completing a second control circuit for energizing the first winding of said second supervisory relay and for completing a second path for shorting in series the winding of said first supervisory relay and the second winding of said second supervisory relay via the control conductor of said trunk in order to effect restoration of said first supervisory relay and to retain operated said second supervisory relay, and means responsive to restoration of said first supervisory relay for transmitting an answer signal to said switchboard.

7. In a telephone system, a switchboard, a trunk circuit provided with a connect relay having a winding and a supervisory relay of the differential type having first and second windings, an automatic switch provided with a pulse relay having first and second windings, a normally completed first path shorting the first winding of said pulse relay, means controllable from said switchboard for seizing said trunk circuit, means responsive to seizure of said trunk circuit for completing a circuit for energizing in series the winding of said connect relay and the first winding of said supervisory relay in order to effect operation of said connect relay and said supervisory relay, means responsive to operation of said connect relay for seizing said switch via a trunk including a pair of line conductors and a hold conductor and a control conductor, said switch being held from said trunk circuit via the hold conductor of said trunk, means responsive to seizure of said switch for completing a circuit for energizing in series the winding of said connect relay and the second winding of said supervisory relay and the second winding of said pulse relay in order to retain operated said connect relay and to effect restoration of said supervisory relay and to effect operation of said pulse relay, means controllable from said switchboard for transmitting impulses to said trunk circuit, means included in said trunk circuit for repeating said impulses to the second winding of said pulse relay via the control conductor of said trunk, means controlled by said pulse relay for operating said switch to extend the call, means for answering the call, means responsive to answering of the call for interrupting said first path and for completing a circuit for energizing the first winding of said pulse relay and for completing a second path for shorting in series the second winding of said supervisory relay and the second winding of said pulse relay in order to retain operated said connect and pulse relays and to effect operation of said supervisory relay, and means responsive to operation of said supervisory relay for transmitting an answer signal to said switchboard.

8. In a telephone system, a repeater comprising an incoming trunk provided with a pair of line conductors and a hold conductor and a control conductor, a trunk line, means for coupling the line conductors of said incoming trunk to said trunk line, a seize relay, a supervisory relay, a signal relay, means responsive to a seizure control on the hold conductor of said incoming trunk for operating said seize relay, said supervisory relay being of the differential type having first and second windings, a normally completed path for shorting the first winding of said supervisory relay, means responsive jointly to operation of said seize relay and to a control potential on the control conductor of said incoming trunk for energizing the second winding of said supervisory relay in order to effect operation thereof, means responsive to operation of said supervisory relay for impressing a call potential via said signal relay upon said trunk line in order to prevent operation of said signal relay, means responsive to impulses of said control potential on the control conductor of said incoming trunk for energizing intermittently the second winding of said supervisory relay in order to cause said supervisory relay to follow, means responsive to following by said supervisory relay for interrupting intermittently said call potential via said signal relay upon said trunk line, means responsive to the subsequent application of an answer potential on said trunk line for operating said signal relay, and means responsive to operation of said signal relay for interrupting said path and for completing a circuit for energizing the first winding of said supervisory relay and for impressing said control potential via the second winding of said supervisory relay upon the control conductor of said incoming trunk in order to short the second winding of said supervisory relay so as to retain operated said supervisory relay and to return an answer signal over the control conductor of said incoming trunk.

9. In a telephone system, a repeater comprising a trunk line, an outgoing trunk provided with a pair of line conductors and a hold conductor and a control conductor, means for coupling said trunk line to the line conductors of said outgoing trunk, a signal relay, a connect relay, a supervisory relay, means responsive to a call signal on said trunk line for operating said signal relay, said supervisory relay being of the differential type having first and second windings, means responsive to operation of said signal relay for operating said connect relay and for completing a first circuit to energize the first winding of said supervisory relay and for impressing a control potential via the second winding of said supervisory relay upon the control conductor of said outgoing trunk in order to complete a second circuit to energize the second winding of said supervisory relay so as to retain restored said supervisory relay, means responsive to operation of said connect relay for placing a seizure control on the hold conductor of said outgoing trunk, means responsive to impulses received over said trunk line for causing said signal relay to follow, means responsive to following by said signal relay for interrupting intermittently said first and second circuits in order to retain restored said supervisory relay and to transmit impulses of said control potential over the control conductor of said outgoing trunk, means responsive to subsequent answering on said outgoing trunk for impressing said control potential on said control conductor in order to short the second winding of said supervisory relay so as to effect operation of said supervisory relay, and means responsive to operation of said supervisory relay for returning an answer signal over said trunk line.

10. In a telephone system, a selector-repeater comprising an incoming trunk provided with a pair of line conductors and a hold conductor and a control conductor, switching mechanism, a pulse relay having first and second windings, a path normally shorting the first winding of said pulse relay, an answer relay, a line having a pair of line conductors, said selector-repeater being seized over said incoming trunk and held over the hold conductor of said incoming trunk, means responsive to a control potential on the control conductor of said incoming trunk for energizing the second winding of said pulse relay in order to cause said pulse relay to operate, means responsive to impulses of said control potential on the control conductor of said incoming trunk for energizing intermittently the second winding of said pulse relay in order to cause said pulse relay to follow, means responsive to following by said pulse relay for operating said switching mechanism to seize said line, means responsive to subsequent following by said pulse relay for repeating impulses over the line conductors of said line in order to extend the call, means responsive to subsequent answering on said line for controlling said answer relay, means responsive to the control of said answer relay for interrupting said path and for completing a circuit for energizing the first winding of said pulse relay and for impressing said control potential via the second winding of said pulse relay upon the control conductor of said incoming trunk in order to retain operated said pulse relay and to return an answer signal over the control conductor of said incoming trunk.

11. In a telephone system, a first exchange including a first source of current supply and a first repeater provided with a first signal relay having a polarizing winding and first and second operating windings, a second exchange including a second source of current supply and a second repeater provided with a second signal relay having a polarizing winding and first and second operating windings, a trunk and a conductor extending between said exchanges, a third source of current supply independent of said first and second supply sources, means including said third supply source and said conductor for energizing the polarizing windings of said first and second signal relays, means including said first supply source for selectively controlling the energization of the first operating winding of said first signal relay, means including said second supply source for selectively controlling the energization of the first operating winding of said second signal relay, means including said first and second supply sources and said trunk for selectively controlling the energization of the second operating windings of said first and second signal relays, each of said signal relays being restored in response to the energization of only the polarizing winding thereof or in response to the conjoint energization of the first and the second operating windings and the polarizing winding thereof, each of said signal relays being operated in response to the conjoint energization of either the first or the second operating winding and the polarizing winding thereof, and means selectively governed by the restored and operated positions of said first and second signal relays for transmitting signals between said first and second exchanges.

12. In a telephone system, a first exchange including a first source of current supply and a first repeater provided with a first signal relay having a polarizing winding and first and second operating windings, a second exchange including a second source of current supply and a second repeater provided with a second signal relay having a polarizing winding and first and second operating windings, first and second resistors respectively disposed in said first and second exchanges, a trunk and a conductor extending between said exchanges, a third source of current supply independent of said first and second supply sources, a series circuit including said first and second resistors and said conductor and said third supply source, a first circuit connecting the polarizing winding of said first signal relay across said first resistor, a second circuit connecting the polarizing winding of said second signal relay across said second resistor, means including said first supply source for selectively controlling the energization of the first operating winding of said first signal relay, means including said second supply source for selectively controlling the energization of the first operating winding of said second signal relay, means including said first and second supply sources and said trunk for selectively controlling the energization of the second operating windings of said first and second signal relays, each of said signal relays being restored in response to the energization of only the polarizing winding thereof or in response to the conjoint energization of the first and the second operating windings and the polarizing winding thereof, each of said signal relays being operated in response to the conjoint energization of either the first or the second operating winding and the polarizing winding thereof, and means selectively governed by the restored and operated positions of said first and second signal relays for transmitting signals between said first and second exchanges.

JOHN WICKS.

No references cited.